United States Patent
Simanek et al.

(10) Patent No.: US 10,410,204 B2
(45) Date of Patent: Sep. 10, 2019

(54) DYNAMIC OFFLINE CARD AUTHORIZATION

(71) Applicant: Accenture Global Solutions Limited, Dublin (IE)

(72) Inventors: Michael Edward Simanek, Chicago, IL (US); Scott T. Butler, Oakville (CA)

(73) Assignee: Accenture Global Solutions Limited, Dublin (IE)

(*) Notice: Subject to any disclaimer, the term of this patent is extended or adjusted under 35 U.S.C. 154(b) by 466 days.

(21) Appl. No.: 15/146,405

(22) Filed: May 4, 2016

(65) Prior Publication Data

US 2017/0278092 A1    Sep. 28, 2017

Related U.S. Application Data

(63) Continuation of application No. 15/145,345, filed on May 3, 2016, which is a continuation of application
(Continued)

(51) Int. Cl.
*G06Q 20/34* (2012.01)
*G06F 3/0481* (2013.01)
(Continued)

(52) U.S. Cl.
CPC ......... *G06Q 20/34* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS

| 7,428,520 B2 | 9/2008 | Armstrong et al. |
| 7,566,003 B2 | 7/2009 | Silbernagl |

(Continued)

FOREIGN PATENT DOCUMENTS

| EP | 2 182 489 | 10/2008 |
| KR | 10 20110071471 | 6/2011 |
| WO | WO 2015/116957 | 8/2015 |

OTHER PUBLICATIONS

European Extended Search Report for Application No. 16173086.6, dated May 3, 2017, 9 pages.
(Continued)

*Primary Examiner* — Tonya Joseph
(74) *Attorney, Agent, or Firm* — Fish & Richardson P.C.

(57) ABSTRACT

Methods, systems, and apparatus, including computer programs encoded on computer storage media, for generating rules to apply to fare transactions when a fare card reader cannot communicate with an authorization server, for generating historical data and a risk score for a fare card that are used by a fare card reader, with the rules, to determine whether to authorize access to a transit service when the fare card reader cannot communicate with the authorization server, and for selectively permitting or denying access to the transit service using the rules and the historical data or the score for a fare card.

20 Claims, 8 Drawing Sheets

Related U.S. Application Data

No. 15/144,428, filed on May 2, 2016, now Pat. No. 10,127,557.

(60) Provisional application No. 62/313,343, filed on Mar. 25, 2016.

(51) Int. Cl.
  *G06F 3/0484* (2013.01)
  *G06Q 10/02* (2012.01)
  *G06Q 10/06* (2012.01)
  *G07B 15/04* (2006.01)

(52) U.S. Cl.
  CPC ......... *G06Q 10/02* (2013.01); *G06Q 10/0635* (2013.01); *G07B 15/04* (2013.01)

(56) References Cited

U.S. PATENT DOCUMENTS

| | | | |
|---|---|---|---|
| 7,568,617 B2 | 8/2009 | Silbernagl et al. | |
| 7,587,756 B2 * | 9/2009 | Peart | G06Q 20/04 380/232 |
| 7,949,738 B2 | 5/2011 | Kumar | |
| 8,181,867 B1 | 5/2012 | Bierbaum et al. | |
| 8,505,816 B2 | 8/2013 | Silbernagl | |
| 8,662,390 B2 | 3/2014 | Silbernagl | |
| 8,690,054 B1 * | 4/2014 | Cummins | G06Q 30/06 235/379 |
| 9,135,612 B1 * | 9/2015 | Proctor, Jr. | G06Q 20/202 |
| 9,911,110 B2 * | 3/2018 | Scott | G06Q 20/204 |
| 2007/0012763 A1 | 1/2007 | Van de Velde et al. | |
| 2007/0187491 A1 | 8/2007 | Godwin et al. | |
| 2007/0192249 A1 | 8/2007 | Biffle et al. | |
| 2008/0203170 A1 | 8/2008 | Hammad et al. | |
| 2009/0171682 A1 | 7/2009 | Dixon et al. | |
| 2011/0000962 A1 | 1/2011 | Chan et al. | |
| 2011/0016054 A1 | 1/2011 | Dixon et al. | |
| 2011/0166997 A1 | 7/2011 | Dixon et al. | |
| 2011/0184778 A1 * | 7/2011 | Graepel | G06N 7/005 705/7.31 |
| 2012/0011062 A1 * | 1/2012 | Baker | G06Q 20/105 705/41 |
| 2012/0255994 A1 | 10/2012 | Silbernagl | |
| 2013/0092734 A1 | 4/2013 | Hasson et al. | |
| 2013/0136253 A1 * | 5/2013 | Liberman Ben-Ami | H04M 3/5191 379/265.09 |
| 2014/0008433 A1 | 1/2014 | Hammad et al. | |
| 2014/0122377 A1 | 5/2014 | Goodman et al. | |
| 2014/0156396 A1 | 6/2014 | DeKozan et al. | |
| 2014/0279309 A1 | 9/2014 | Cowen et al. | |
| 2014/0289023 A1 * | 9/2014 | Busch-Sorensen | G07F 7/12 705/13 |
| 2015/0220929 A1 | 8/2015 | Monk | |
| 2015/0254579 A1 * | 9/2015 | Ford | G06Q 10/02 705/5 |
| 2016/0171471 A1 * | 6/2016 | Kerschbaumer | G06Q 20/40 705/21 |
| 2017/0278324 A1 * | 9/2017 | Simanek | G06Q 20/4016 |

OTHER PUBLICATIONS

European Extended Search Report for Application No. 16173087.4, dated May 3, 2017, 8 pages.
European Extended Search Report for Application No. 16173090.8, dated May 3, 2017, 7 pages.
Australian Office Action for Application No. 2017201398, dated Oct. 17, 2017, 2 pages.
Australian Office Action for Application No. 2017201401, dated Oct. 12, 2017, 2 pages.
Australian Office Action in Application No. 2016203813, dated Jul. 22, 2016, 6 pages.
Australian Office Action for Application No. 2017201401, dated Jun. 30, 2017, 5 pages.
Australian Office Action for Application No. 2017201398, dated Jun. 28, 2017, 5 pages.
How it Works/Ventra, "From transit to transactions, Ventrqa does it all," [online], [retrieved from the internet], https://www.ventrachicago.com/howitworks/[Jan. 8, 2016 11:46:02 AM], 6 pages.

\* cited by examiner

DYNAMIC OFFLINE CARD AUTHORIZATION

CROSS-REFERENCE TO RELATED APPLICATIONS

This application is a continuation of U.S. application Ser. No. 15/145,345, filed May 3, 2016, which is a continuation of U.S. application Ser. No. 15/144,428, filed May 2, 2016, which claims the benefit of U.S. Provisional Application Ser. No. 62/313,343, titled DYNAMIC OFFLINE CARD AUTHORIZATION, and filed on Mar. 25, 2016. All of these prior applications are incorporated by reference in their entirety.

BACKGROUND

Some fare collection systems include a card reader, e.g., as part of a field device, that reads data from a fare card during a transaction and determines contextual information for the transaction, e.g., date, time, and location. The card reader may provide some of the data from the fare card and the contextual information to a centralized authorization device that determines whether to provide the fare card holder with a valid right-to-travel, e.g., to use a transit service. The centralized authorization device may provide a signal to the field device to provide visual clues, auditory clues, or both, to the fare card holder. The centralized authorization device may provide a signal to the field device to cause an appropriate physical action, e.g., opening of a fare gate.

A fare card may be a "closed-loop card" issued by a transit agency or a third party where the transit agency holds the funds for the fare card. A fare card may be an "open payment card" such as a credit, debit, or another bank issued card, where funds are managed by a separate card issuer and paid to a transit agency after use.

SUMMARY

In some implementations, an edge device receives data for a fare card being used to access a transit service. The edge device may be part of an account based system and receive the data from a fare card reader. In some examples, the edge device may be a local fare card analysis system. When online, the edge device queries a central system for product, balance and validity information associated with an account for the fare card to determine whether a cardholder of the fare card should be allowed access to the transit service.

When the edge device is offline, e.g., when the edge device is unable to communicate with the central system, the edge device uses locally stored data to dynamically determine a risk of allowing the cardholder access to the transit service. For instance, the edge device may use locally stored rules and historical data for the fare card, or an account to which the fare card is assigned, to dynamically determine whether to allow or deny the cardholder access to the transit service. The edge device may be offline due to loss of network connectivity or the central system being down to name a few examples.

The edge device may have historical data for multiple fare cards, or corresponding accounts, that may include the current balance of the fare cards, prior to disconnection of the edge device from the central system, how frequently transactions for the account have been denied, e.g., when the central system attempts to add funds to the account for the fare card, how frequently the cardholder uses the transit service, or other historical data for the fare card or the account. The edge device accesses rules to determine, using the historical data, a risk associated with allowing the cardholder access to the transit service. In some examples, the risk may represent a likelihood that the central system will have or be able to acquire sufficient funds for the cardholder's use of the transit service. In some implementations, the edge device may use artificial intelligence and the historical data to determine whether to allow or deny the cardholder's access to the transit service.

The edge device may use localized factors, e.g., transaction contextual information, to determine whether to allow or deny the cardholder's access to the transit service. For example, the edge device may select a particular set of rules, from multiple sets of rules, based on how long the edge device has been out of communication with the central system, where the edge device is currently physically located, or both. For instance, the edge device may deny a particular cardholder's access to the transit service, using the historical data, when the edge device has been offline, e.g., out of communication with the central system, for three hours and the edge device may allow the particular cardholder's access to the transit service, using the same historical data, when the edge device has been offline for sixteen hours, e.g., using a different set of rules. The edge device may use rules described in the example above when a transit system assumes that the historical data is more likely to be inaccurate and have changed over a longer period of time, e.g., the cardholder's balance has likely been increased. In some examples, the edge device may use rules that allow access when the edge device has been offline for a shorter period of time and deny access when the edge device has been offline for a longer period of time, e.g., using the same historical data. In some examples, the edge device may use the rules with analytics including algorithms that determine whether to deny access when the edge device has been offline.

In general, one innovative aspect of the subject matter described in this specification can be embodied in methods that include the actions of communicating, by a local card analysis system using an interface included in the local card analysis system, with a central system when the local card analysis system is in an online mode, receiving fare card information from a fare card reader, and sending a control signal to a gate, the control signal causing the gate to maintain an open position to allow access to a transit service when the fare card is accepted; receiving, via the interface, a list of cards and historical data from the central system when the local card analysis system is in the online mode, storing the list of cards and the historical data in a memory, determining that the local card analysis system is in an offline mode, receiving, via the interface and from the card reader, data for a particular card, the data identifying the particular card being used to request access to the transit service, determining, using the list of cards stored in the memory and the data identifying the particular card, historical data for the particular card in response to determining that the local card analysis system is in the offline mode, determining, for the particular card, whether the particular card is accepted and to allow access to the transit service using rules and the historical data for the particular card, the rules for determining whether to admit or deny gate access when the local card analysis system is operating in an offline mode, and performing one of: selectively opening the gate in response to determining that the particular card is accepted and to allow access to the transit service using the rules and the historical data for the particular card, or selectively maintaining the gate in a closed position in response to determining that the particular card is not accepted and to deny access to the transit service using the rules and the historical data for the particular card. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by a local card analysis system, a list of cards and historical data for the cards from a central system when the local card analysis system is in an online mode, determining that the local card analysis system is in an offline mode, retrieving, from a memory, rules for the local card analysis system to use when in an offline mode to determine whether to allow or deny a transaction, receiving, from a card reader for a particular card, data identifying the particular card being used in a transaction for a product or service, determining, using the list of cards stored and the data identifying the particular card, historical data for the particular card in response to determining that the local card analysis system is in the offline mode, determining, for the particular card, whether the particular card is accepted and to allow the transaction using the rules and the historical data for the particular card, and performing one of: selectively allowing the transaction in response to determining that the particular card is accepted and to allow the transaction, or selectively denying the transaction in response to determining that the particular card is not accepted and to deny the transaction. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of obtaining, by a server, account information corresponding to multiple fare cards, the account information for each fare card including: one or more fare card transaction records, where each fare card transaction record reflects a fare card transaction, each fare card transaction record including: a label that indicates whether a fare for the fare card transaction was paid, and attributes that indicate (i) information about the fare card at the time of the fare card transaction or (ii) a context of the fare card transaction, identifying types of attributes in the account information that are relevant in determining whether a fare for a fare card transaction will be paid based at least on the labels that indicate whether the fares for the fare card transactions were paid, determining a risk score for a particular fare card based on (i) the account information corresponding to the particular card and (ii) the types of attributes identified to be relevant, determining that the risk score for the particular fare card satisfies a risk threshold, storing in a list of cards, when the risk threshold is satisfied, (i) an identifier for the particular card and (ii) information that corresponds to the types of attributes identified to be relevant from the account information for the particular card, and providing the list of cards to a fare card reader. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of generating a graphical user interface including one or more controls for specifying a fare card reader, receiving a selection of a fare card reader through the one or more controls, receiving a selection of a set of rules for the selected fare card reader, the selection applied to fare card transactions through the one or more controls to select the set of rules for the selected fare card reader to apply to fare card transactions when the fare card reader is not in communication with the server, receiving input specifying one or more conditions specifying when the selected fare card reader is to apply the set of rules to fare card transactions when the fare card reader is not in communication with the server, the one or more conditions specifying when the selected fare card reader is to apply the set of rules through the one or more controls to specify one or more conditions when the selected fare card reader is to apply the set of rules, and providing, by the server to the selected fare card reader, the selected set of rules with the specified one or more conditions when the selected fare card reader is to apply the set of rules to fare card transactions when the fare card reader is not in communication with the server. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include, for a second particular card that is a different card than the particular card: receiving, via the interface and from the card reader, data identifying the second particular card being used for access to the transit service, determining, using the list of cards stored in the memory and the data identifying the second particular card, historical data for the second particular card in response to determining that the system is in the offline mode, determining that the second particular card is not accepted and to deny access to the transit service using the historical data for the second particular card, and maintaining the gate in a closed position in response to determining that the second particular card is not accepted and to deny access to the transit service. Determining, for the particular card, whether the particular card is accepted and to allow access to the transit service using the rules and the historical data for the particular card may include determining, for the particular card, that the particular card is accepted and to allow access to the transit service using the rules and the historical data for the particular card. Performing one of selectively opening the gate or selectively maintaining the gate in a closed position may include opening the gate in response to determining that the particular card is accepted and to allow access to the transit service using the rules and the historical data for the particular card. The method may include receiving the rules from the central system when the system is in the online mode. The method may include receiving the rules when the system is programmed.

In some implementations, the method may include determining a length of time that has passed since receiving the list of cards and the historical data for the cards from the central system. Determining whether the particular card is accepted and to allow access to the transit service may include determining whether the particular card is accepted and to allow access to the transit service using the rules, the length of time that has passed since receiving the list of cards, and the historical data for the particular card. The method may include determining an estimated fare cost for the transit service with respect to the particular card. Determining whether the particular card is accepted and to allow access to the transit service may include determining whether the particular card is accepted and to allow access to the transit service using the rules, the estimated fare cost for the transit service with respect to the particular card, and the historical data for the particular card. The method may include determining a type of transit for the transit service. Determining whether the particular card is accepted and to allow access to the transit service may include determining whether the particular card is accepted and to allow access to the transit service using the rules, using the type of transit for the transit service, and the historical data for the particular card. Determining the type of transit for the transit service comprises determining whether the transit service may include a bus service, a train service, a trolley service, an airplane service, a boat service, a bicycle service, a cable car service, an elevator service, or a car service.

In some implementations, the method may include determining a current risk level. Determining whether the particular card is accepted and to allow access to the transit service may include determining whether the particular card is accepted and to allow access to the transit service using the rules, the current risk level, and the historical data for the particular card. The method may include determining a desired throughput. Determining whether the particular card is accepted and to allow access to the transit service may include determining whether the particular card is accepted and to allow access to the transit service using the rules, the desired throughput, and the historical data for the particular card. The method may include determining, using the historical data for the particular card, a declined rate for the particular card. Determining whether the particular card is accepted and to allow access to the transit service may include determining whether the particular card is accepted and to allow access to the transit service using the rules, and the declined rate for the particular card. Determining the declined rate for the particular card may include determining a quantity of times that the particular card is declined. Determining the declined rate for the particular card may include determining a percentage of times that the particular card is declined. The local analysis system may be part of a transaction system. Determining the percentage of times that the particular card is declined may include determining a percentage of times that the particular card is declined during transactions with the transaction system.

In some implementations, the method may include determining, using the historical data for the particular card, an estimated card balance for the particular card. Determining whether the particular card is accepted and to allow access to the transit service may include determining whether the particular card is accepted and to allow access to the transit service using the rules, and the estimated card balance for the particular card. Determining, using the historical data for the particular card, the estimated card balance for the particular card may include determining a card balance for the particular card that was a balance for the particular card prior to the local analysis system entering the offline mode. The method may include determining, using the historical data for the particular card, loyalty data for the particular card. Determining whether the particular card is accepted and to allow access to the transit service may include determining whether the particular card is accepted and to allow access to the transit service using the rules, and the loyalty data for the particular card. Determining, using the historical data for the particular card, the loyalty data for the particular card may include determining, using the historical data for the particular card, a quantity of times the particular card has been used. Determining, using the historical data for the particular card, the loyalty data for the particular card may include determining, using the historical data for the particular card, a frequency of use for the particular card. Determining, using the historical data for the particular card, the frequency of use for the particular card may include determining, using the historical data for the particular card, a daily, weekly, or monthly frequency of use for the particular card.

In some implementations, the method may include determining, using the historical data for the particular card, account data for an account to which the particular card belongs. Determining whether the particular card is accepted and to allow access to the transit service may include determining whether the particular card is accepted and to allow access to the transit service using the rules, and the account data for the account to which the particular card belongs. Determining, using the historical data for the particular card, the account data for the account to which the particular card belongs may include determining a balance for a different card that belongs to the account. Determining whether the particular card is accepted and to allow access to the transit service using the account data for the account to which the particular card belongs may include determining whether the particular card is accepted and to allow access to the transit service using the balance for the different card that belongs to the account. Determining, using the historical data for the particular card, the account data for the account to which the particular card belongs may include determining loyalty data for the account. Determining whether the particular card is accepted and to allow access to the transit service using the account data for the account to which the particular card belongs may include determining whether the particular card is accepted and to allow access to the transit service using the loyalty data for the account.

In some implementations, the list of cards may be an encrypted list of cards. The historical data for the cards may include an encrypted list of historical data for the cards. The list of cards and the historical data for the cards may be encrypted using software encryption. The memory encrypts the list of cards and the historical data for the cards may be encrypted using hardware encryption. The method may include determining a current risk level, and, for a second particular card: receiving, from the card reader, data identifying the second particular card being used for access to the transit service, determining, using the data identifying the second particular card, that the list of cards stored in the memory does not include data for the second particular card in response to determining that the local analysis system is in the offline mode, and determining whether the second particular card is accepted and to allow or deny access to the transit service using the current risk level in response to determining that the list of cards stored in the memory does not include data for the second particular card. Determining whether the second particular card is accepted and to allow or deny access to the transit service using the current risk level in response to determining that the list of cards stored in the memory does not include data for the second particular card may include determining whether the second particular card is accepted and to allow or deny access to the transit service using only the current risk level in response to determining that the list of cards stored in the memory does not include data for the second particular card.

In some implementations, the method may include, for a second particular card that is a different card than the particular card: receiving, from the card reader, data identifying the second particular card being used in a transaction for a product or service, determining, using the list of cards stored in the memory and the data identifying the second particular card, historical data for the second particular card in response to determining that the system is in the offline mode, determining that the second particular card is not accepted and to deny the transaction using the historical data for the second particular card, and denying the transaction in response to determining that the second particular card is not accepted and to deny the transaction. Determining, for the particular card, whether the particular card is accepted and to allow the transaction using the rules and the historical data for the particular card may include determining, for the particular card, that the particular card is accepted and to allow the transaction using the rules and the historical data for the particular card. Performing one of selectively allowing the transaction or selectively denying the transaction may include allowing the transaction in response to determining that the particular card is accepted and to allow the transaction.

In some implementations, the method may include determining a length of time that has passed since receiving the list of cards and the historical data for the cards from the central system. Determining whether the particular card is accepted and to allow the transaction may include determining whether the particular card is accepted and to allow the transaction using the rules, length of time that has passed since receiving the list of cards, and the historical data for the particular card. The method may include determining a current risk level. Determining whether the particular card is accepted and to allow the transaction may include determining whether the particular card is accepted and to allow the transaction using the rules, the current risk level, and the historical data for the particular card. The method may include determining a desired throughput. Determining whether the particular card is accepted and to allow the transaction may include determining whether the particular card is accepted and to allow the transaction using the rules, the desired throughput, and the historical data for the particular card.

In some implementations, the method may include determining, using the historical data for the particular card, a declined rate for the particular card. Determining whether the particular card is accepted and to allow the transaction may include determining whether the particular card is accepted and to allow the transaction using the rules, and the declined rate for the particular card. Determining the declined rate for the particular card may include determining a quantity of times that the particular card is declined. Determining the declined rate for the particular card may include determining a percentage of times that the particular card is declined. The card reader may be part of a transaction system. Determining the percentage of times that the particular card is declined may include determining a percentage of times that the particular card is declined during transactions with the transaction system. The method may include determining, using the historical data for the particular card, an estimated card balance for the particular card. Determining whether the particular card is accepted and to allow the transaction may include determining whether the particular card is accepted and to allow the transaction using the rules, and the estimated card balance for the particular card. Determining, using the historical data for the particular card, the estimated card balance for the particular card may include determining a card balance for the particular card that was a balance for the particular card prior to the system entering the offline mode.

In some implementations, the method may include determining, using the historical data for the particular card, loyalty data for the particular card. Determining whether the particular card is accepted and to allow the transaction may include determining whether the particular card is accepted and to allow the transaction using the rules, and the loyalty data for the particular card. Determining, using the historical data for the particular card, the loyalty data for the particular card may include determining, using the historical data for the particular card, a quantity of times the particular card has been used. Determining, using the historical data for the particular card, the loyalty data for the particular card may include determining, using the historical data for the particular card, a frequency of use for the particular card. Determining, using the historical data for the particular card, the frequency of use for the particular card may include determining, using the historical data for the particular card, a daily, weekly, or monthly frequency of use for the particular card. The method may include determining, using the historical data for the particular card, account data for an account to which the particular card belongs. Determining whether the particular card is accepted and to allow the transaction may include determining whether the particular card is accepted and to allow the transaction using the rules, and the account data for the account to which the particular card belongs. Determining, using the historical data for the particular card, the account data for the account to which the particular card belongs may include determining a balance for a different card that belongs to the account. Determining whether to allow or deny the transaction using the account data for the account to which the particular card belongs may include determining whether to allow or deny the transaction using the balance for the different card that belongs to the account. Determining, using the historical data for the particular card, the account data for the account to which the particular card belongs may include determining loyalty data for the account. Determining whether to allow or deny the transaction using the account data for the account to which the particular card belongs may include determining whether to allow or deny the transaction using the loyalty data for the account.

In some implementations, the list of cards may include an encrypted list of cards. The historical data for the cards may include an encrypted list of historical data for the cards. The list of cards and the historical data for the cards may be encrypted using software encryption. The memory may encrypt the list of cards and the historical data for the cards using hardware encryption. The method may include determining a current risk level, and, for a second particular card: receiving, from the card reader, data identifying the second particular card being used in a transaction for a product or service, determining, using the data identifying the second particular card, that the list of cards stored in the memory does not include data for the second particular card in response to determining that the system is in the offline mode, and determining whether the second particular card is accepted and to allow or deny the transaction using the current risk level in response to determining that the list of cards stored in the memory does not include data for the second particular card. Determining whether the second particular card is accepted and to allow or deny the transaction using the current risk level in response to determining that the list of cards stored in the memory does not include data for the second particular card may include determining whether the second particular card is accepted and to allow or deny the transaction using only the current risk level in response to determining that the list of cards stored in the memory does not include data for the second particular card. Receiving, from the card reader, the data identifying the particular card being used in a transaction for a product or service may include receiving, from a credit card reader, the data identifying the particular card being used in a transaction to purchase a product or service. The method may include determining a cost of the product or service. Determining whether the particular card is accepted and to allow the transaction may include determining whether the particular card is accepted and to allow the transaction using the rules, and the cost of the product or service, and the historical data for the particular card. The method may include determining, using the list of cards stored in the memory and the data identifying the particular card, a purchase history for the particular card or an account for the particular card. Determining whether the particular card is accepted and to allow the transaction may include determining whether the particular card is accepted and to allow the transaction using the rules, and the purchase history for the particular card or the account for the particular card.

In some implementations, obtaining account information corresponding to multiple fare cards may include obtaining fare card transaction information from multiple fare card readers. Identifying types of attributes in the account information that are relevant in determining whether a fare for a fare card transaction will be paid based at least on the labels that indicate whether the fares for the fare card transactions were paid may include identifying fare card transactions that were paid based on the labels, identifying fare card transaction that were not paid based on the labels, and identifying the types of attributes that have values for the fare card transactions that were paid and that have different values for the fare card transactions that were not paid. Identifying types of attributes in the account information that are relevant in determining whether a fare for a fare card transaction will be paid based at least on the labels that indicate whether the fares for the fare card transactions were paid may include providing the account information to a neural network to identify types of attributes in the account information that are relevant in determining whether a fare for a fare card transaction will be paid.

In some implementations, determining a risk score for a particular fare card based on (i) the account information corresponding to the particular card and (ii) the types of attributes identified to be relevant may include obtaining current values for the particular fare card for the types of attributes identified to be relevant, and determining the risk score based on the current values. Determining the risk score based on the current values may include obtaining a risk function for generating a risk score, and determining the risk score from current values and the risk function. Obtaining a risk function for generating a risk score may include determining the risk function based on the values of the types of attributes in the account information that are relevant and the labels that indicate whether the fares for the fare card transactions were paid. The method may include determining the risk score for the particular card satisfies the risk threshold. Storing in a list of cards, when the risk threshold is satisfied, (i) an identifier for the particular card and (ii) information that corresponds to the types of attributes identified to be relevant from the account information for the particular card may include obtaining current values for the particular fare card for the types of attributes identified to be relevant, and storing the current values in the list of cards in association with the identifier for the particular card.

In some implementations, generating a graphical user interface including one or more controls for specifying a fare card reader may include identifying multiple fare card readers in a mass transit system, and providing in the graphical user interface one or more controls to select one or more of the multiple fare card readers of the mass transit system or a group of fare card readers. Generating a graphical user interface including one or more controls for specifying a fare card reader may include providing in the graphical user interface one or more controls to select the set of rules for the selected fare card reader to apply to fare card transactions when the fare card reader is not in communication with the server. Providing in the graphical user interface one or more controls to select the set of rules for the selected fare card reader to apply to fare card transactions when the fare card reader is not in communication with the server may include obtaining multiple rule sets generated by the server based on account information corresponding to multiple fare cards, where account information for each fare card includes one or more fare card transaction records, where each fare card transaction record reflects a fare card transaction and includes: a label indicating whether a fare for the fare card transaction was paid, and attributes that indicate (i) information about the fare card at the time of the fare card transaction or (ii) a context of the fare card transaction, and providing in the graphical user interface one or more controls to select the set of rules from the multiple rule sets.

In some implementations, providing in the graphical user interface one or more controls to select the set of rules for the selected fare card reader to apply to fare card transactions when the fare card reader is not in communication with the server may include providing in the graphical user interface one or more controls for the administrator to select a set of attributes upon which the selected set of rules operate. Providing in the graphical user interface one or more controls to select the set of rules for the selected fare card reader to apply to fare card transactions when the fare card reader is not in communication with the server may include identifying rule sets that can be used by the selected fare card reader, and providing in the graphical user interface one or more controls to select the set of rules from among the rule sets that are identified to be usable by the selected fare card reader. The method may include providing in the graphical user interface one or more controls to specify the one or more conditions when the selected fare card reader is to apply the set of rules to fare card transactions when the fare card reader is not in communication with the server. Providing in the graphical user interface one or more controls to specify the one or more conditions when the selected fare card reader is to apply the set of rules to fare card transactions when the fare card reader is not in communication with the server may include providing in the graphical user interface one or more controls to specify a time duration when the selected fare card reader is to apply the selected set of rules to fare card transactions when the fare card reader is not in communication with the server.

In some implementations, the method may include determining that the selected fare card reader has not been provided the selected set of rules, wherein providing the selected set of rules in association with the specified one or more conditions is in response to determining that the selected fare card reader has not been provided the selected set of rules. The method may include determining that the selected rule set is updated, in response to determining that the selected rule set is updated, identifying the selected fare card reader, and providing updates to the selected rule set to the selected fare card reader.

The subject matter described in this specification can be implemented in particular embodiments and may result in one or more of the following advantages. In some implementations, a local card analysis system makes a dynamic risk determination of whether to allow or deny access. In some implementations, a local card analysis system allows an entity to dynamically set a limit, or multiple limits based on different data, at which the local card analysis system will reject cards. In some implementations, a local card analysis system provides an entity, e.g., a merchant, with the flexibility to balance customer convenience and business risk when making a decision of whether to allow or deny a transaction when the local card analysis system is offline. In some implementations, a local card analysis system may allow dynamic decisions of whether to allow or deny access to a product or service when the local card analysis system does not have a connection with a central system that normally authorizes transactions. For instance, the local card analysis system may make a dynamic decision using historical card information, historical account information, transaction contextual information, or a combination of two or more of these.

In some implementations, the central system may identify types of attributes for cards that are relevant in determining whether a transaction using the card will be paid, and using the identified types of attributes, determine risks that particular cards will be involved in future transactions that will not be paid. The central system may provide the local card analysis systems information that indicates (i) the cards that are identified to be likely to be involved in future transactions that are unpaid and (ii) values for the types of attributes that are determined to be relevant in determining whether a transaction using the card will be paid, and not provide information for those cards that are not identified as not likely to be involved in transactions that are unpaid. As a result of the selective providing of information about the cards, the system may reduce an amount of bandwidth used to transmit account information to the local card analysis systems, an amount of memory used by the local card analysis systems to store the account information, and an amount of processing needed by the local card analysis systems to determine whether to allow or deny access when offline from the central server. In some implementations, as additional relevant attributes are identified, the system can become smarter and start to use only the most relevant attributes. This may allow the edge devices to continually improve their decision making by taking advantage of centralized data analysis with significantly greater computing power.

In some implementations, a rule administration system may enable administrators to specify rules that the local card analysis systems use in deciding whether to allow or deny access to a product or service when the local card analysis system does not have a connection with a central system that normally authorizes transactions. For example, an administrator may configure the rule administration system to specify that during a special event, e.g., a fireworks show, a particular mass transit fare card reader near a location of the special event should apply a rule that allows wider access than a default rule for the particular fare card reader that may otherwise result in a backlog of people attempting to gain access to the mass transit system after being denied. The rule administration system may also enable administrators to create or modify rules to provide to local card analysis systems. Accordingly, the rule administration system may enable flexibility in what rules are applied at what times to what local card analysis systems. In some implementations, rule configuration can set default attributes and then indicate how best to utilize the default attributes for the purposes of reducing risk while maintaining customer convenience.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
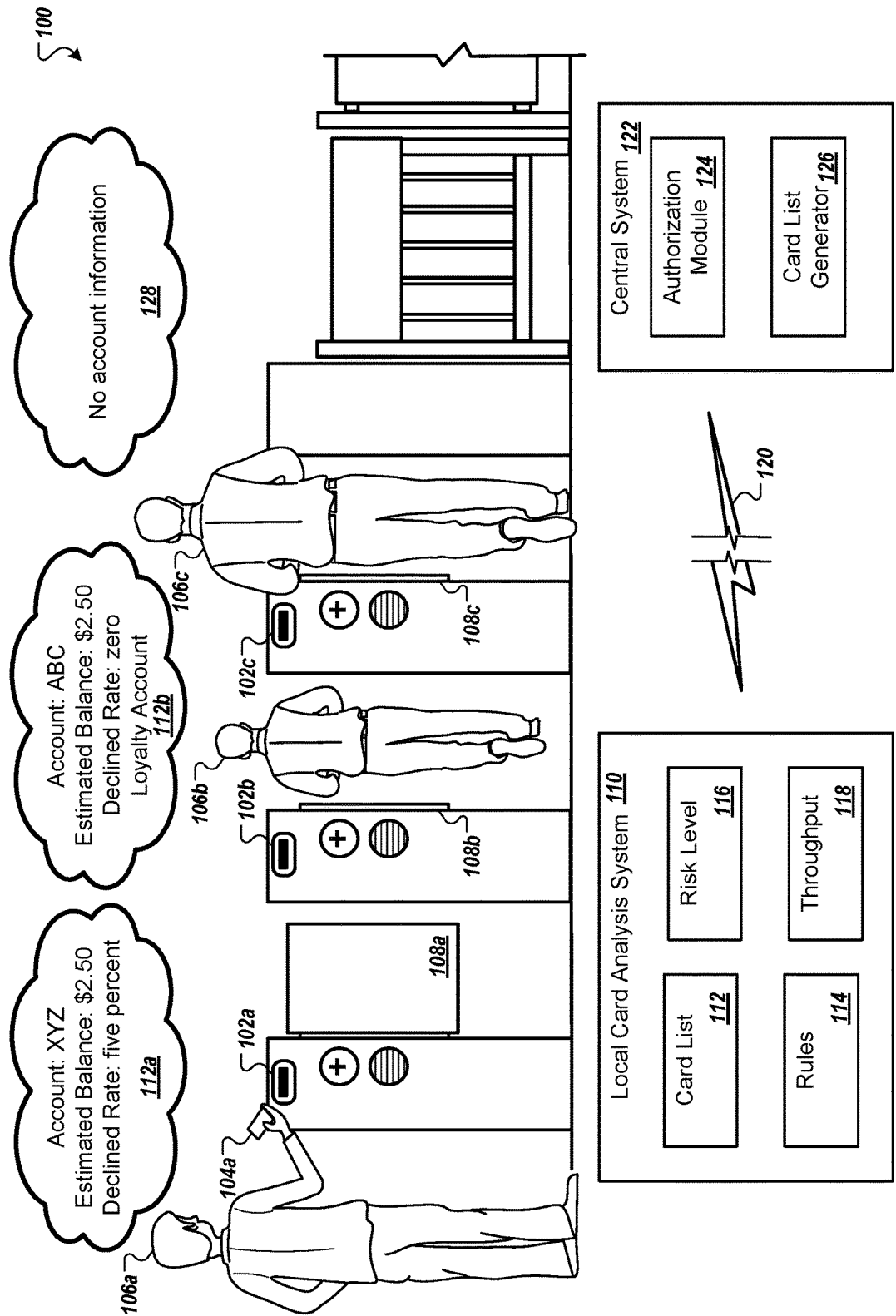
FIG. 1 shows an example of an environment in which a local card analysis system dynamically determines whether to allow or deny access to a transit service.

In some implementations, when a local card analysis system is offline or cannot otherwise connect to a central system, the local card analysis system uses a subset of card account information to dynamically determine, at the time of a transaction, whether to allow or deny the transaction. For instance, the local card analysis system may include a card list and account information for the cards on the list. The account information may include a series of attributes such as a last known balance, a last known decline, whether a fare card account is enrolled in an automatic replenishment program, a count of successful past account reloads, or a combination of two or more of these, to name a few examples.

When the local card analysis system receives data identifying a card for use in a transaction and the local card analysis system is offline, the local card analysis system uses the account information, and potentially transaction contextual information, to determine an amount of risk inherent in accepting the card for use with the transaction. The local card analysis system uses the amount of risk to determine whether to allow or deny the transaction. When the amount of risk satisfies a threshold risk, the local card analysis system denies the transaction. When the amount of risk does not satisfy the threshold risk, the local card analysis system allows the transaction.

Some examples of transaction contextual information include the duration of time for which the local card analysis system has been unable to communicate with the central system, e.g., for which the local card analysis system has been offline, the time of day, the day of week, a type of transaction, a current physical location of the local card analysis system, contextual information specific an access card, e.g., whether the card was printed by an end user printer or a system kiosk, or a combination of two or more of these. For instance, a type of transaction may include a type of transit, such as a bus, a subway, or a train. The local card analysis system may access rules that define different logic for different types of transactions that would allow a transaction for a particular card accessing one type of transit and deny a transaction for the particular card accessing a different type of transit using the same account information for the particular card, e.g., when the different type of transit, on average, has a higher transit cost, an entity has a different risk for different types of transit, or both.

In some implementations, a local card analysis system allows an entity to dynamically set a limit at which the local card analysis system will reject cards. For example, the entity could define different rules based on the duration of time for which the local card analysis system has been offline to adjust the range at which the local card analysis system will accept cards. The entity may assume that the longer the local card analysis system is offline, the more likely account data stored on the local card analysis system is out-of-sync with data at the central system and define rules that allow more transactions over time for cards with historical data identifying negative or low balances while the local card analysis system remains offline, e.g., to give a customer an increasing benefit of doubt over time that the balances are higher. Alternatively, an entity may have a lower risk tolerance and define rules that deny more transactions over time for cards with historical data identifying negative or low balances while the local card analysis system remains offline, e.g., to lower the entity's risk exposure.

FIG. 1 shows an example of an environment 100 in which a local card analysis system dynamically determines whether to allow or deny access to a transit service. The environment includes multiple fare card readers A-C 102a-c each of which receive a fare card identifier from a corresponding fare card. For example, the fare card reader A 102a may receive an identifier from a first fare card 104a when a first passenger 106a requests access to the transit service. The fare cards may be paper fare cards, smart cards, or any other appropriate type of fare card.

A local card analysis system 110 receives the card identifier for the first fare card 104a from the fare card reader A 102a and determines whether the local card analysis system 110 is in an online mode. For instance, when the local card analysis system 110 is in the online mode, the local card analysis system 110 has access to a central system 122 and requests authorization for the first fare card 104a from the central system 122. The central system 122 would use an authorization module 124 to determine whether to allow or deny access to the transit service for the first passenger 106a. The authorization module 124 may be a module or component of the central system 122. The local card analysis system 110 would receive a response from the central system 122 indicating whether to allow or deny access to the transit service and cause a gate 108a-c to open or remain closed in response, e.g., by sending corresponding instructions to a gate control module that controls the operation of one of the gates 108a-c or all of the gates 108a-c.

In the example shown in FIG. 1, the local card analysis system 110 does not have access to the central system 122, e.g., a network connection 120 is not working and the local card analysis system 110 is offline. When the local card analysis system 110 determines that it is offline, the local card analysis system 110 uses the card identifier to determine whether the card identifier is on a card list 112. When the card identifier is included on the card list 112, the local card analysis system 110 determines first historical data 112a, included in the card list 112, for the first fare card 104a. For instance, the local card analysis system 110 determines an entry in the card list 112, identified by the card identifier, that includes the first historical data 112a for the first fare card 104a. The card list 112 may be stored in a database and the first historical data 112a may be a record in the database identified by the card identifier. The card list 112 may be any appropriate type of list that associates card identifiers with corresponding historical data.

The local card analysis system 110, for example, may determine that the first fare card 104a is for account XYZ, account XYZ has an estimated balance of $2.50, and that a payment card used to automatically add more money to the account XYZ has been declined five percent of the time, e.g., in transactions with the transit service when adding more money to the account XYZ, as indicated by the first historical data 112a.

The local card analysis system 110 accesses rules 114 to determine whether to allow or deny the first passenger's 106a access to the transit service. For instance, the local card analysis system 110 uses the rules 114 and the first historical data 112a for the first fare card 104a to determine whether to allow or deny the first passenger 106a access to the transit service. The rules may indicate that when a balance for an account is low, e.g., below a threshold amount, such as $5, the local card analysis system 110 should deny access to the transit service and maintain a first gate 108a in a closed position. In some examples, the rules may indicate that when the account balance is below the threshold amount and a card used to add more funds to the account has been declined more than a threshold amount, the local card analysis system 110 should deny the first passenger 106a access to the transit service and maintain a first gate 108a in a closed position.

When the local card analysis system 110 receives a card identifier for a second fare card, the local card analysis system 110 determines second historical data 112b for a second passenger 106b, e.g., when the local card analysis system 110 remains in offline mode. The second historical data 112b may indicate that the second fare card, for the second passenger 106b, is associated with an account ABC, that account ABC has an estimated balance of $2.50 and a payment card used to add additional funds to the account ABC has not been declined, e.g., during processing of additional funds requests for the account ABC, and that the account ABC is a loyalty account. For instance, a loyalty account may be an account for which the corresponding second fare card is used every weekday, at least a threshold number of times each week or each month, or both. Other appropriate factors may be used to determine, e.g., by a card list generator 126 in the central system 122, whether an account is a loyalty account.

The local card analysis system 110 uses the rules 114 and the second historical data 112b to determine whether to allow or deny the second passenger's 106b access to the transit service. For instance, the local card analysis system 110 determines that, although the estimated balance for the account ABC is $2.50, the account ABC is a loyalty account and a refill payment card has never been declined so the second passenger 106b should be allowed access to the transit service. In response, the local card analysis system 110 causes the second gate 108b to open to allow the second passenger 106b access to the transit service, as shown in FIG. 1.

The historical data in the card list 112 includes estimated balances for the fare cards identified in the card list 112. For instance, the estimated balance is a balance of the fare card at the time the local card analysis system 110 was last online, or a balance of the fare card at the time the local card analysis system 110 received the card list 112 from the central system 122. The estimated balance may be another appropriate balance for the corresponding fare card or account.

For example, the estimated balance may be a single balance for a card, may include multiple balances for an account to which multiple cards are assigned, or may be a single balance that is a sum of the balances for all of the cards assigned to a particular account. When an account is associated with multiple fare cards, the local card analysis system 110 may use the rules 114 to determine that although a particular fare card being used to gain access to the transit service might not have sufficient funds for use of the transit service, another fare card associated with the same account is likely to have sufficient funds and a corresponding passenger should be allowed access to the transit service.

When the local card analysis system 110 is offline and receives a card identifier for a third fare card, used by a third passenger 106c, the local card analysis system 110 determines whether the card list 112 includes the card identifier for the third fare card. The local card analysis system 110 determines that there is no account information 128 for the third card included in the card list 112. The card list 112 may not have account information for the third fare card because the third fare card was recently activated, e.g., and the central system 122 does not have account information for the third fare card, or the third fare card is not likely to have insufficient funds, e.g., and should be allowed. The card list generator 126 may use any appropriate method to determine whether to include a card on the card list 112.

For instance, as described in more detail below, an entity that controls the transit service may determine a risk level 116 for the local card analysis system 110, specific to only the local card analysis system 110, specific to the transit service, or specific to multiple local card analysis systems. The card list generator 126 may use the risk level 116 to determine which fare cards should be identified on the card list 112. The use of the risk level 116, or other appropriate settings, allows the entity to determine an amount of risk exposure the entity is willing to take and how many cards are included on the card list 112. For instance, the risk level 116 or another setting, allows the card list generator 126 to generate the card list 112 with information for fare cards with low balances in addition to negative balances so that the local card analysis system 110 dynamically makes a decision of whether to allow or deny access to the transit service at the time access is requested, e.g., and not make a binary decision based on whether or not a card is listed on the card list 112.

The local card analysis system 110 may use transaction contextual information to determine whether to allow or deny the third passenger 106c access to the transit service. For instance, the local card analysis system 110 may determine that the risk level 116 is high, e.g., the entity that controls the local card analysis system 110 has a high risk tolerance, and that the third passenger 106c should be allowed access to the transit service, as shown in FIG. 1. In some examples, the local card analysis system 110 may determine that the risk level 116 is low, e.g., the entity that controls the local card analysis system 110 has a low risk tolerance, and the third passenger 106c should be denied access to the transit service.

The local card analysis system 110 may use other transaction contextual information to determine whether to allow or deny access to the transit service, as described in more detail below with reference to FIG. 2. For instance, the local card analysis system 110 may use a throughput level 118, a duration of time for which the local card analysis system 110 has been offline, a duration of time since the local card analysis system 110 received the card list 112 from the central system 122, the time of day, the day of week, the type of transaction, the current physical location of the local card analysis system 110, the risk level 116, or a combination of two or more of these, when determining whether to allow or deny access to the transit service, potentially in conjunction with historical data for a fare card when available. In some implementations, the card list 112, risk level 116, rules 114, and the throughput level 118 may be modules or components in the local card analysis system 110.

The network 120, such as a local area network (LAN), wide area network (WAN), the Internet, or a combination thereof, connects the local card analysis system 110 and the central system 122. The local card analysis system 110 may be a single computer or multiple computers operating in conjunction with one another.

In some implementations, the local card analysis system 110 may be used for other types of products or services in addition to, or instead of, a transit service. For instance, the local card analysis system 110 may be used to determine whether to accept or decline a purchase with a credit card when a credit card reader, and the local card analysis system 110, are unable to communicate with the central system 122.

The local card analysis system 110 may receive card information from the credit card reader, such as the credit card number, a name of an account holder for the credit card, or other account information. The local card analysis system 110 determines whether the card list 112 includes an entry for the credit card number and, if so, historical data for the account associated with the credit card number.

The historical information may include past purchase information, e.g., for the entity at which the credit card is being used, a declined rate, e.g., for the entity at which the credit card is being used, loyalty information, or a combination of two or more of these. For example, the local card analysis system 110 may be specific to a particular entity, e.g., at which a customer is using the credit card to purchase a product or service. The local card analysis system 110 may have historical data including types of products or services purchased, e.g., at the entity, total transaction costs, costs for the individual purchased products or services, or a combination of two or more of these. The declined rate may be a percentage, e.g., of transactions at the entity for which the credit card has been declined, or a quantity of times the credit card has been declined at the entity.

In some implementations, the historical data may include a credit card limit or an estimated credit card limit. For instance, when the credit card is specific to the entity, e.g., is a credit card offered by the entity, the historical data may include a credit card limit. When the credit card is specific to another entity, e.g., a bank, the historical data may include an estimated credit card limit determined based on the transactions in which the credit card was used at the entity. In some examples, when the credit card is specific to another entity, the entity may receive approval to access the credit card limit of the credit card, e.g., from an account holder for the credit card.

The local card analysis system 110 uses the historical data and transaction contextual information to determine whether to allow or deny the credit card. For instance, the local card analysis system 110 uses a current cost of the products or services being purchased in a transaction and the total transaction costs for previous purchases at the entity in which the credit card was used to determine whether to allow or deny the transaction. The local card analysis system 110 may use the rules 114 to determine that when the highest total transaction cost, the median total transaction cost, or the average total transaction cost is greater than the current cost, to allow the transaction. The local card analysis system may use the rules 114 to determine that when the highest total transaction cost, the median total transaction cost, or the average total transaction cost is not greater than the current cost, to deny the transaction. The local card analysis system 110 may use any appropriate rules to determine whether to allow or deny a transaction.

When the local card analysis system 110 determines that a card is not on the card list 112, the local card analysis system 110 uses the risk level 116, and potentially other transaction contextual information, to determine whether to allow or deny the transaction. For instance, the risk level 116 may indicate that purchase for a predetermined value or less, e.g., $10 or less, should be allowed and all other purchases should be denied. For example, when the local card analysis system 110 receives a credit card identifier for a $20 transaction, the local card analysis system 110 may determine that the credit card identifier is not on the card list 112 and that the risk level 116 indicates that the transaction should be denied. In some examples, the risk level 116 or the rules 114 may indicate that all transactions for credit cards not on the card list 112 should be denied. In these examples, the local card analysis system 110 performs a dynamic determination of whether to allow or deny a transaction for the cards identified on the card list 112, e.g., some cards may be allowed for some transactions and others denied, depending on the historical data for the cards, the transaction contextual information, or both.

In some examples, the local card analysis system 110 may determine to deny a transaction for a particular card and then allow a different transaction for the particular card. For instance, the local card analysis system 110 may deny a first transaction for a first dollar amount and then allow a second transaction for a second dollar amount that is less than the first dollar amount. The local card analysis system 110 may determine that the first dollar amount does not satisfy a maximum amount for an account associated with the particular card, e.g., is greater than a maximum allowable amount, and that the second dollar amount does satisfy the maximum amount, e.g., is less than the maximum allowable amount.

In some implementations, the local card analysis system 110 determines whether to allow or deny contactless forms of payment, e.g., in addition to or instead of credit cards. For instance, the local card analysis system 110 may determine whether to allow or deny a transaction in which a mobile device or a smart card is used as a payment type.

In some implementations, the local card analysis system 110 may be used as part of a ticketing system in which persons are allowed or denied access to a service that was purchased previously. For instance, the local card analysis system 110 determine whether to allow or deny access to a service such as a concert, a play, a sporting event, a pre-purchase transit service, or a ride to which access was previously purchased.

In these implementations, the historical data may include loyalty information, a fraud rate, and other appropriate information. The loyalty information may indicate whether a ticket holder is a season ticket holder, purchases a threshold quantity of tickets each season or year, or both. The fraud rate may indicate whether a ticket holder has attempted to use multiple copies of the same ticket to gain access to a single event, e.g., when the ticket holder prints tickets themselves and does not receive official tickets from a ticketing entity.

In some implementations, the historical data may include contextual information. For instance, the local card analysis system 110 may determine that a ticket was printed on a home printer and a rule from the rules 114 associated with tickets printed on a home printer. The local card analysis system 110 may use the rule, with other contextual information, other rules, or both, to determine whether to allow or deny a transaction to which the ticket corresponds.

The local card analysis system 110 may receive identification of a ticket number and an account for the ticket. The local card analysis system 110 uses the account for the ticket to access the card list 112 and determine historical data for the account. The local card analysis system 110 uses the historical data and transaction contextual information, such as whether the ticket is an official ticket or not, to determine whether to allow or deny access to a service. For instance, when a ticket was printed on a home printer and an account associated with the ticket has a five percent fraud rate, a local card analysis system may deny a ticket holder access to a corresponding service, e.g., a ski lift or a ball game, when the local card analysis system is in an offline mode. When a ticket is an official ticket or an account associated with the ticket is a loyalty account or doesn't have a fraud rate, e.g., the fraud rate is zero, the local card analysis system may allow a ticket holder access to a corresponding service when the local card analysis system is in an offline mode. When the local card analysis system is online, the local card analysis system queries a central system to determine whether the ticket has been redeemed and a corresponding ticket holder should be allowed access to the corresponding service that was previously purchased.

The rules 114 may be defined by an administrator, may be determined using artificial intelligence, or both. For instance, as described in more detail below, an administrator may define all of the rules such that the rules use one or both of historical data or transaction contextual data to determine whether to allow or deny a transaction. In some implementations, a neural network may be trained, e.g., by the central system 122, to determine whether to allow or deny a transaction based on a desired risk level for an entity. The central system 122 may provide the neural network to the local card analysis system 110 as the rules 114 or part of the rules 114.

In some implementations, the local card analysis system 110, the central system 122, or both, may use artificial intelligence to generate some of the rules 114, to determine which rules to use in particular contexts, or both. For instance, the central system 122 may use artificial intelligence to determine that a particular rule which relies upon three particular types of data, data one, data two, and data three, should be updated to rely on two types of data, data one and data four. The central system 122 may determine that data two and data three are less relevant than data four, e.g., based on analysis of multiple transactions for the central system 122 and corresponding contextual information, historical information, or both. The central system 122 may determine that data four is a new type of contextual information and, using artificial intelligence, is more relevant to the particular rule than the data two or the data three and update the particular rule.

The local card analysis system 110 receives the rules from the central system 122, e.g., via the network 120 when the local card analysis system 110 is online. In some examples, the local card analysis system 110 is pre-programmed with the rules 114 in a memory.

When the local card analysis system 110 is online, the local card analysis system 110 receives the card list 112 from the central system 122. The local card analysis system 110 receives an updated card list 112, and associated historical data, according to a schedule. For instance, the local card analysis system 110 may receive the card list 112 once a day, e.g., at 5 AM each day, twice a day or according to another appropriate schedule. The frequency at which the local card analysis system 110 receives the card list 112 may be determined based on the risk level 116 for an entity. For instance, a first entity with a high risk tolerance and a corresponding high risk level may configure a local card analysis system to receive an updated card list less frequently compared to a second entity with a low risk tolerance and a corresponding low risk level.

Figure 2:
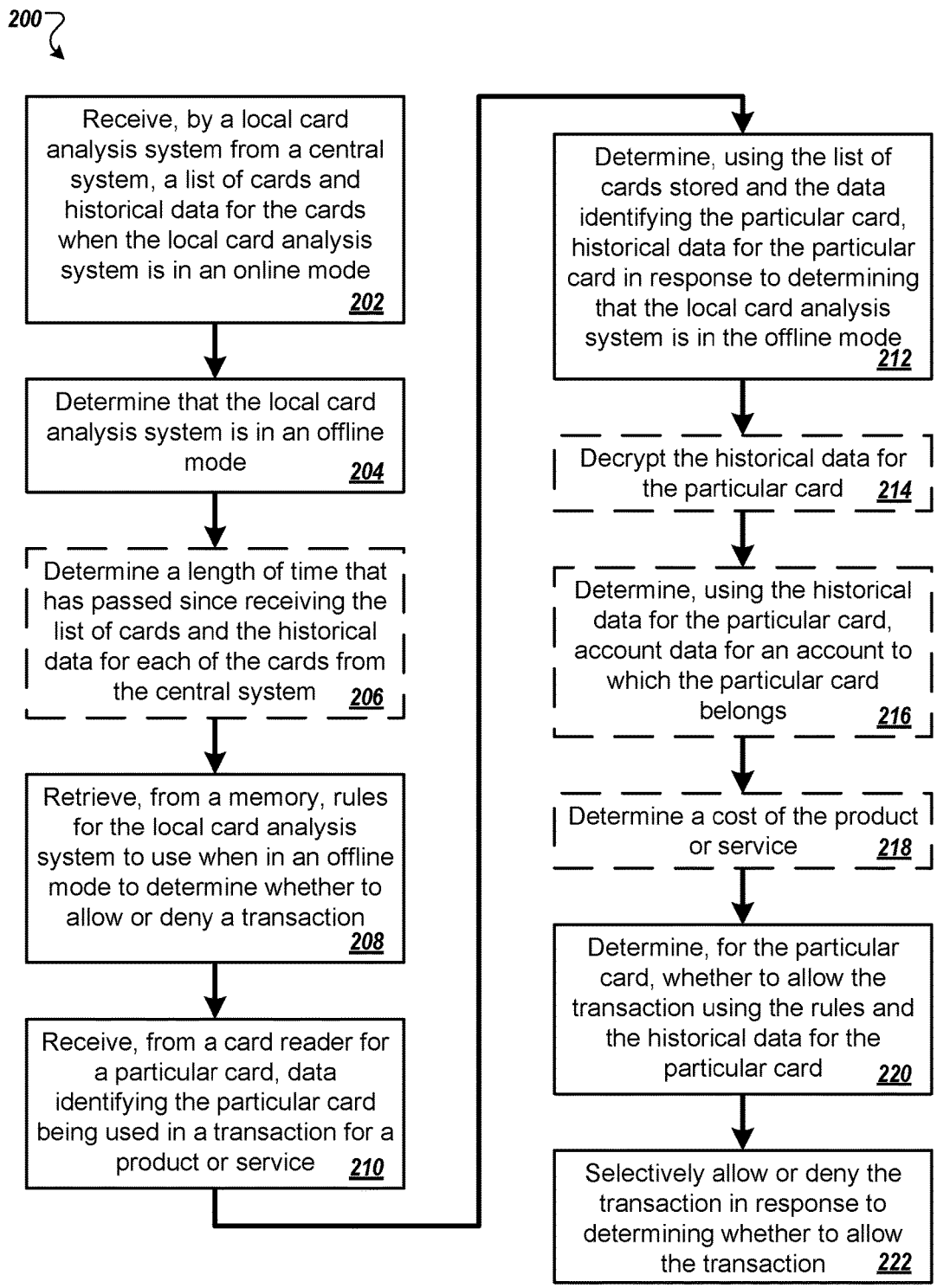
FIG. 2 is a flow diagram of an example process for selectively allowing or denying a transaction.

FIG. 2 is a flow diagram of a process 200 for selectively allowing or denying a transaction. For example, the process 200 can be used by the local card analysis system 110 from the environment 100 to determine whether to allow or deny access to a transit service.

A local card analysis system receives, from a central system, a list of cards and historical data for the cards when the local card analysis system is in an online mode (202). For example, the list of cards may include a current balance for each of the cards, loyalty information for each of the cards, information about whether or not an automatic refill payment has been denied for some of the cards, or a combination of two or more of these. The list of cards may include any appropriate historical information.

The local card analysis system determines that the local card analysis system is in an offline mode (204). For example, the local card analysis system determines that the local card analysis system is unable to connect to a network, e.g., the Internet, the central system, e.g., when the central system is down, or both.

The local card analysis system optionally determines a length of time that has passed since receiving the list of cards and the historical data for each of the cards from the central system (206). For instance, the local card analysis system may use the length of time when determining whether to allow or deny a transaction while in the offline mode.

The local card analysis system retrieves, from a memory, rules for the local card analysis system to use when in an offline mode to determine whether to allow or deny a transaction (208). The local card analysis system may retrieve the rules from the same memory which stores the list of cards or a different memory. In some examples, the rules are stored in the local card analysis system during setup of the local card analysis system. In some examples, the local card analysis system receives the rules from the central system, e.g., periodically.

The local card analysis system receives, from a card reader for a particular card, data identifying the particular card being used in a transaction for a product or service (210). For example, the local card analysis system receives an identifier from the card reader that indicates the particular card. The identifier may be an account number, a card number, or other appropriate identification information.

In some implementations, the data identifying the particular card may be encrypted. For instance, the card reader may receive the identifier and encrypted the identifier. The local card analysis system receives the encrypted identifier from the card reader. In some examples, the card reader may receive an encrypted identifier from the card and provide the encrypted identifier to the local card analysis system.

The local card analysis system determines, using the list of cards stored and the data identifying the particular card, historical data for the particular card when the local card analysis system is in the offline mode (212). For instance, the local card analysis system uses the card identifier to locate a record in a database for the particular card, e.g., using the card identifier as an index for the record. The local card analysis system accesses the record to determine the historical data for the particular card. The local card analysis system may use the card identifier, e.g., in an encrypted or unencrypted form, to determine the historical data for the particular card. In some examples, the local card analysis system may decrypt an encrypted card identifier and use the decrypted card identifier to determine the historical data.

The local card analysis system optionally decrypts the historical data for the particular card (214). For example, the local card analysis system may store the historical data in a particular memory in an encrypted form, e.g., to preserve the privacy of the historical data stored. The local card analysis system may use hardware encryption and decryption, software encryption and decryption, or both.

For instance, the local card analysis system may receive the historical data from the central system in an encrypted form, e.g., when the card list was encrypted on the central system using software encryption. The local card analysis system stores the software encrypted card list on the particular memory using hardware encryption. When retrieving data from the card list, the local card analysis system uses hardware decryption to access the card list and determine the record for the particular card. The local card analysis system may retrieve the determined record for the particular card and use software decryption to determine the historical data for the particular card.

In some implementations, the central system may only collect historical data for an account in response to receipt of a user indication that the historical data may be collected. For instance, the central system may generate instructions for presentation of a user interface that allows a user to indicate whether or not the central system may include historical data in the card list for a corresponding account. The user interface may allow a user to select which data is included in the historical data.

The local card analysis system optionally determines, using the historical data for the particular card, account data for an account to which the particular card belongs (216). For instance, when the local card analysis system uses information for the account and not only the particular card, e.g., based on the rules, the local card analysis system determines the account to which the particular card belongs and account data for the determined account.

The local card analysis system optionally determines a cost of the product or service (218). For instance, the local card analysis system determines an estimated transit cost, e.g., when the cost is variable, or a fixed transit cost. The local card analysis system may determine the estimated transit cost using the day, time of day, historical data, e.g., when the historical data indicates an average fare cost for the particular card, or any other appropriate information. In some examples, when the cost of a product or service is fixed, the local card analysis system determines an actual cost for a transaction. The local card analysis system may determine other transaction contextual information.

The local card analysis system determines, for the particular card, whether to allow the transaction using the rules and the historical data for the particular card (220). In some examples, the local card analysis system may determine whether to allow or deny a transaction using transaction contextual information. For instance, the local card analysis system may use a desired throughput level that indicates a desired throughput for a transit service, e.g., a number or a percentage. When the local card analysis system determines that there is a high volume of traffic at a transit station, e.g., a high number of potential passengers, and the desired throughout level is high, the local card analysis system may allow a transaction to maintain or try to maintain the desired throughput level when the local card analysis system might otherwise deny the transaction.

In some examples, the local card analysis system may use a time of day, day of week, week of month, whether a current day is a holiday, or a combination of two or more of these, when determining whether to allow or deny a transaction, e.g., according to the rules. For instance, the local card analysis system may allow a transaction at 11 PM which would be denied if the transaction occurred around noon. The local card analysis system may allow a transaction on a holiday or a weekend that would otherwise be denied.

In some implementations, the local card analysis system may use a type of transaction, e.g., a type of transit, when determining whether to allow or deny a transaction. For instance, a local card analysis system may allow a transaction for access to a subway and deny a transaction for access to a light rail, e.g., when using the same historical data for a particular card. The local card analysis system may deny one transaction and allow the other according to the rules, e.g., when one service typically costs more than the other. In some examples, a first local card analysis system, for a first type of transaction, may allow a first transaction using particular historical data and a second local card analysis system, for a second type of transaction, may deny a second transaction using the particular historical data. The particular historical data may be for the same card or account or may be for different cards or different accounts which both have the same historical data.

The local card analysis system may use a current physical location of the local card analysis system when determining whether to allow or deny a transaction. For example, when the local card analysis system is located on a bus, the local card analysis system may deny a transaction for a first card with specific historical data when the bus is at a first location, e.g., toward the beginning of a bus route, and allow a transaction for a second card with the same historical data when the bus is at a second location, e.g., toward the end of the bus route. The local card analysis system may determine that the balances on both cards are low, and deny a transaction for the first card given that a total fare cost may be greater than the balance and allow a transaction for the second card given that a total fare cost for the second card will be or will likely be less than the balance.

The local card analysis system selectively allows or denies the transaction in response to determining whether to allow the transaction (222). For example, the local card analysis system uses the historical data, the transaction contextual information, or both, to determine whether to allow or deny the transaction. In response to determining to allow the transaction, the local card analysis system may send a signal indicating that the transaction should be allowed or denied. For instance, the local card analysis system may send a signal to a gate controller instructing the gate to open to allow access to the transit service. In response to determining to deny the transaction, the local card analysis system may send a signal to a display controller indicating that the transaction has been denied.

In some implementations, the local card analysis system may send a signal to a display controller that indicates whether the transaction is allowed or denied. The display controller may cause a display to present a message indicating whether the transaction was allowed or denied.

The order of steps in the process 200 described above is illustrative only, and selectively allowing or denying the transaction can be performed in different orders. For example, the local card analysis system may receive data identifying the particular card and then determine that the local card analysis system is in the offline mode. In some examples, the local card analysis system may determine the transaction contextual information, including the rules, the length of time that has passed since the local card analysis system received the list of cards, or other transaction contextual information, at any time before, after, or during receipt of the data identifying the particular card.

In some implementations, the process 200 can include additional steps, fewer steps, or some of the steps can be divided into multiple steps. For example, the process may include steps 202, 204, 208 through 212, 220, and 222.

In some implementations, a local card analysis system may determine an agency or entity to which a transaction applies. For instance, a local card analysis system may include different rules for different agencies or entities, or two local card analysis systems may each include rules for a particular agency or entity, the first local card analysis system for a first agency and the second local card analysis system for a second agency that is a different agency from the first agency.

Figure 3:
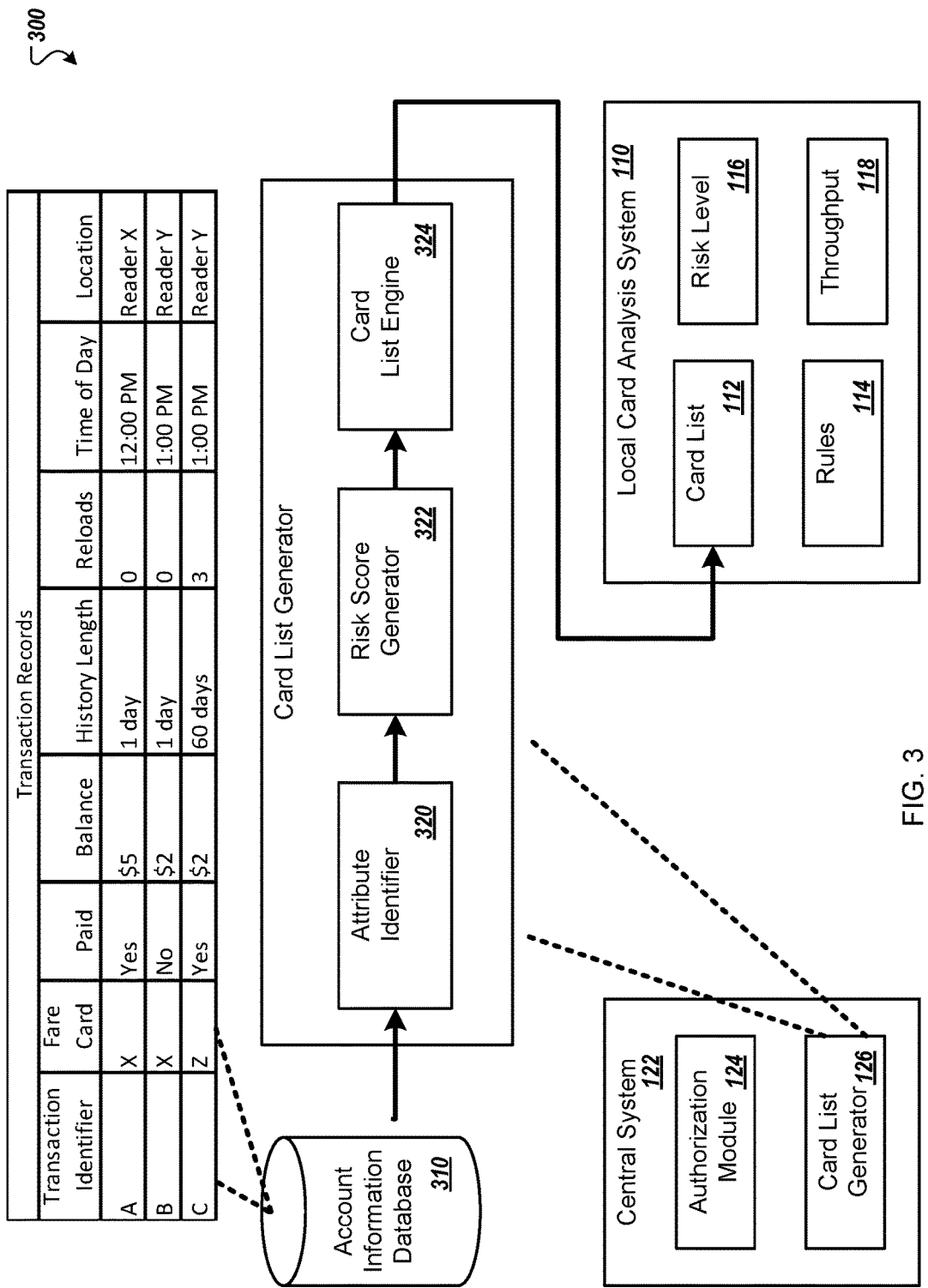
FIG. 3 shows a block diagram of an example system for identifying types of attributes that are relevant in determining whether a fare will be paid.

FIG. 3 shows an example of a block diagram of a system 300 for identifying types of attributes that are relevant in determining whether a fare will be paid. The following describes the system 300 in the environment 100. However, the system 300 may be used in other environments.

The system 300 may include an account information database 310, an attribute identifier 320, a risk score generator 322, and a card list engine 324. The attribute identifier 320, the risk score generator 322, and the card list engine 324 may all be modules or components of the card list generator 126 and the card list generator 126 may be a module or component of the central system 122.

The account information database 310 may store account information. For example, the account information database 310 may store information describing accounts associated with multiple fare cards. The account information may include, for each of multiple fare cards, one or more fare card transaction records. For example, the account information may include one or more fare card transactions for "Fare Card X," "Fare Card Y," and other fare cards. Each of the fare card transaction records may include a label that indicates whether the fare for the fare card transaction was paid. For example, a first fare card transaction may include a label for "Yes" that indicates a fare was paid and a second fare card transaction may include a label for "No" that indicates that a fare was unpaid. The account information database 310 may be made up of smaller items, e.g., data structures or tables. For example, each of the data structures or tables of the account information database 310 may include one or more fare card transaction records.

Each of the fare card transaction records may further include attributes that indicate information about the fare card at the time of the fare card transaction or with respect to a context of the fare card transaction. The information about the fare card at the time of the fare card transaction may include, for example, a fare card balance, a history length, or a number of reloads. The fare card balance may reflect an amount of value on the fare card at the time of the fare card transaction, the history length may reflect an amount of time that the fare card had been used at the time of the fare card transaction since a first use, and the number of reloads may indicate the number of times that value had been added to the card at the time of the fare card transaction. Other examples of information about the card may include a time since a last known decline, whether a fare card account is enrolled in an automatic replenishment program, a decline rate, or other information. Information about a context of the fare card transaction may include, at the time of a fare card transaction, a time of day of the transaction, a location of a fare card reader, a day of the week, a type of transaction, or the amount of time that a fare card reader was offline.

In a particular example of fare card transaction records, a first fare card transaction record may indicate that a fare was paid, the fare card identifier was X, the balance was $5, the history length was one day, a number of reloads was zero, a time of day was noon, and a location of a fare card reader was a location of reader X at the time of the transaction. A second fare card transaction record may indicate that a fare was not paid, the fare card identifier was X, the balance was $2, the history length was one day, a number of reloads was zero, a time of day was 1 PM, and a location of a fare card reader was a location of reader Y at the time of the transaction. A third fare card transaction record may indicate that a fare was paid, the fare card identifier was Z, the balance was $2, the history length was sixty day, a number of reloads was three, a time of day was 1 PM, and a location of a fare card reader was a location of reader Y at the time of the transaction.

The attribute identifier 320 may obtain the account information from the account information database 310 and identify types of attributes in the account information that are relevant in determining whether a fare for a fare card transaction will be paid based at least on the labels that indicate whether the fares for the fare card transactions were paid. For example, the attribute identifier 320 may determine that the attributes of balance and reloads are relevant in determining whether a fare for a fare card transaction will be paid.

The attribute identifier 320 may identify the types of attributes in the account information that are relevant in determining whether a fare for a fare card transaction will be paid based on machine learning. For example, the attribute identifier 320 may be a neural network that receives all the fare card transaction records labeled as paid or unpaid, identifies patterns or values that are relevant in determining whether a fare will be paid or unpaid. The attribute identifier 320 may further identify the types of attributes corresponding to those patterns or values as the attributes that are relevant in determining whether a fare for a fare card transaction will be paid based on machine learning. Machine-learning refers to techniques where a machine learns from data provided to the machine.

In a particular example of machine learning, the attribute identifier 320 may determine that fare cards that are never reloaded are likely to be unpaid once the balance is below the amount of a fare; and, as a result, attribute identifier 320 may identify that number of reloads is relevant in determining whether a fare will be paid or unpaid. In another example, the attribute identifier 320 may determine that no pattern exists between values for types of transaction, e.g., bus, rail, train, or some other form of transportation, and a fare being paid or unpaid, and in response, determine that type of transaction is not relevant in determining whether a fare for a fare card transaction will be paid.

In another example, the attribute identifier 320 may identify fare card transactions that were paid based on the labels, identify fare card transactions that were not paid based on the labels, and identify the types of attributes that have values for the fare card transactions that were paid that have different values for the fare card transactions there were not paid. In a particular example, the attribute identifier 320 may identify one thousand fare card transactions that were not paid based on labels of unpaid, identify one thousand fare card transactions that were paid based on labels of paid, determine an average reload number for fare cards used in the paid transactions is five and the average reload number of fare cards used in the unpaid transactions is one, determine that the average reload number for fare cards is different between the paid transactions and the unpaid transactions, and in response to determining a difference between the averages, identify the reload number as an attribute that is relevant to determining whether a fare for a fare card transaction will be paid.

In some implementations, the attribute identifier 320 may generate a risk score function based on the values of attributes in the account information that are relevant in determining whether a fare for a fare card transaction will be paid. For example, the attribute identifier 320 may determine a risk score function that receives as inputs the values of the types of attributes in the account information determined to be relevant to determining whether a fare for a fare card transaction will be paid and the labels for whether the fares were paid. In a particular example where the attribute identifier 320 determines that a reload number is the only relevant type of attribute, the average reload number for fare cards used in the paid transactions is five, and the average reload number of fare cards used in the unpaid transactions is one, the attribute identifier may determine a risk score function that increases a risk score for a fare card the more the reload number for the fare card is less than five. Accordingly, the attribute identifier 320 may analyze the account information to first identify attributes in the account information that are relevant in determining whether a fare for a fare card transaction will be paid, and then analyze the values of those attributes in the account information that are relevant in determining whether a fare for a fare card transaction will be paid to generate a risk score function.

In some implementations, the attribute identifier 320 may also generate the rules for the local card analysis system 110 as described above. For example, the attribute identifier 320 may generate rules based on the values of the types of attributes in the account information that are relevant in determining whether a fare for a fare card transaction will be paid. The rules may further take into account a current context of a transaction for the local card analysis system 110 to consider. For example, the rules may include as a factor a length of time that the local card analysis system 110 is offline that may not be particularly relevant for the central server in determining whether a fare card will be involved in a future fare card transaction that is not paid.

In some implementations, the attribute identifier 320 may limit the number of types of attributes identified. For example, the attribute identifier 320 may determine to identify only types of attributes that increase accuracy of predicting whether previous fare transactions will be paid by an amount that is greater than 5%, 10%, 20%, or some other predetermined percent, correspondence. In another implementation, the attribute identifier 320 may determine to identify only the three, five, ten, or some other predetermined number, of types of attributes that provided the greatest increase in accuracy of predicting whether previous fare transactions will be paid.

The risk score generator 322 may receive the indications of types of attributes that have been identified by the attribute identifier 320 as relevant to determining whether a fare for a fare card transaction will be paid and the account information for a particular fare card, and in response, generate a risk score for each fare card. The risk score for a fare card may reflect a likelihood whether a fare for a future fare card transaction using the fare card will be paid. For example, a low risk score, e.g., 0%-20% or some other range, may be associated with a low likelihood of a fare not being paid and a high risk score, e.g., 80%-100% or some other range, may be associated with a high likelihood of a fare card not being paid.

The risk score generator 322 may generate risk scores for each of the fare cards based on values of the attributes in the account information that are identified to be relevant in determining whether a fare for a fare card transaction will be paid. For example, the risk score generator 322 may determine a low risk score for "Fare Card Z" based on determining that for the attributes of history length and number of reloads that are identified to be relevant in determining whether a fare for a fare card transaction will be paid, the current value of the history length is a high length of sixty days and a number of reloads is a moderate amount of three. In another example, the risk score generator 322 may determine a high risk score for "Fare Card Y" based on determining that for the attributes of history length and number of reloads that are identified to be relevant in determining whether a fare for a fare card transaction will be paid, the current value of the history length is a low length of two days and a number of reloads is a low amount of zero reloads. As discussed above, in other examples other attributes may be determined to be relevant and other risk score generator 322 may determine a risk score based on a risk function generated by the attribute identifier 320.

The card list engine 324 may receive the account information and the determined risk scores, and in response, generate a list of cards to be provided to fare card readers for the fare card readers to determine whether to allow access to a transit service using a fare card. For example, the card list engine 324 may receive risk scores where two thousand out of one hundred thousand fare cards are determined to have high risk scores, and in response, provide the fare card reader's list of cards identifying only the two thousand fare cards with high risk scores and account information of those two thousand fare cards for the types of attributes that are determined to be relevant in determining whether a fare for a fare card transaction will be paid. The account information included in the list of cards may also be referred to as the historical data discussed above.

In generating the list of cards, the card list engine 324 may determine whether the risk scores for cards satisfy a risk threshold. For example, the card list engine 324 may determine that a risk score for "Fare Card X" of 80% satisfies a risk threshold as it is above 50% and determine that a risk score for "Fare Card Y" of 20% does not satisfy the risk threshold as it is below 50%. In other examples the risk threshold may be 30%, 40%, 60% or some other threshold.

In some implementations, the card list engine 324 may determine a risk threshold based on limitations of the fare card readers. For example, the card list engine 324 may determine a memory capacity of a particular fare card reader is one hundred thousand entries, and in response, determine a risk threshold that results in less than one hundred thousand fare cards satisfying the risk threshold or may determine to only include in the list of cards the one hundred thousand fare cards with the highest risk scores that satisfy the risk threshold.

In some implementations, the card list engine 324 may consider the number of attributes or size of memory used by each attribute that is determined to be relevant in determining whether a fare for a fare card transaction will be paid in determining the risk threshold. For example, the card list engine 324 may determine that when less attributes are identified less memory is needed for each entry for a fare card and more fare card entries may be included, and conversely, when more attributes are identified more memory is needed for each entry for a fare card and more fare card entries may be included.

In response to determining that the risk score for a fare card satisfies the risk threshold, the card list engine 324 may store an identifier for the particular card and account information for the particular card corresponding to the types of attributes identified to be relevant in determining whether a fare for a fare card transaction will be paid. For example, in response to determining that a risk score of "Fare Card X" satisfies the risk threshold and that balance and reload number are types of attributes that are most relevant in determining whether a fare for a fare card transaction will be paid, the card list engine 324 may store a unique identifier for "Fare Card X," the current balance value of $3, and a current reload number of one in the list of cards without storing values for any of the other attributes for the fare card.

The card list engine 324 may then provide the list of cards to the local card analysis system 110. For example, the card list engine 324 may provide a list of cards including "Fare Card X," the current balance of $3, and current reload number of one as historical data for "Fare Card X" to fare card reader Y. In some implementations where the attribute identifier 320 may determine rules for the local card analysis system 110, the card list engine 324 may also provide any updated rules with the list of cards.

In some implementations, the card list generator 126 may generate a list of cards that are specific to fare card readers. For example, the attribute identifier 320 may initially filter account information to only fare card transactions for a particular fare card reader and then provide the list of cards generated based identifying types of attributes in the filtered account information that are relevant in determining whether a fare for a fare card transaction will be paid.

In some implementations, the card list generator 126 may update the list of cards in response to a satisfaction of update criteria. Update criteria may be based on time or changes in account information. For example, the card list generator 126 may update the list of cards every minute, every hour, every day, or some other interval. In another example, the card list generator 126 may update the list of cards in response to determining that more than 1% of the account information changes. In yet another example, the card list generator 126 may update the list of cards in response to determining that more than one thousand fare card transactions have occurred based on receiving information for new fare card transactions from local card analysis systems.

In some implementations, the card list generator 126 may provide updates on the list of cards based on the fare card reader receiving the list of cards. For example, the card list generator 126 may provide the list of cards to stationary fare card readers at fifteen minute intervals and to fare card readers in buses that may go offline at five minute intervals or when the card list generator 126 determines that the bus is about to go offline based on a route of a bus, e.g., into a tunnel. In some implementations, the frequency of updates may be based on bandwidth usage. For example, the card list generator 126 may determine that for list of cards that are of larger memory size the updates will be less frequent and for list of cards that are of smaller memory size the updates will be more frequent.

Figure 4:
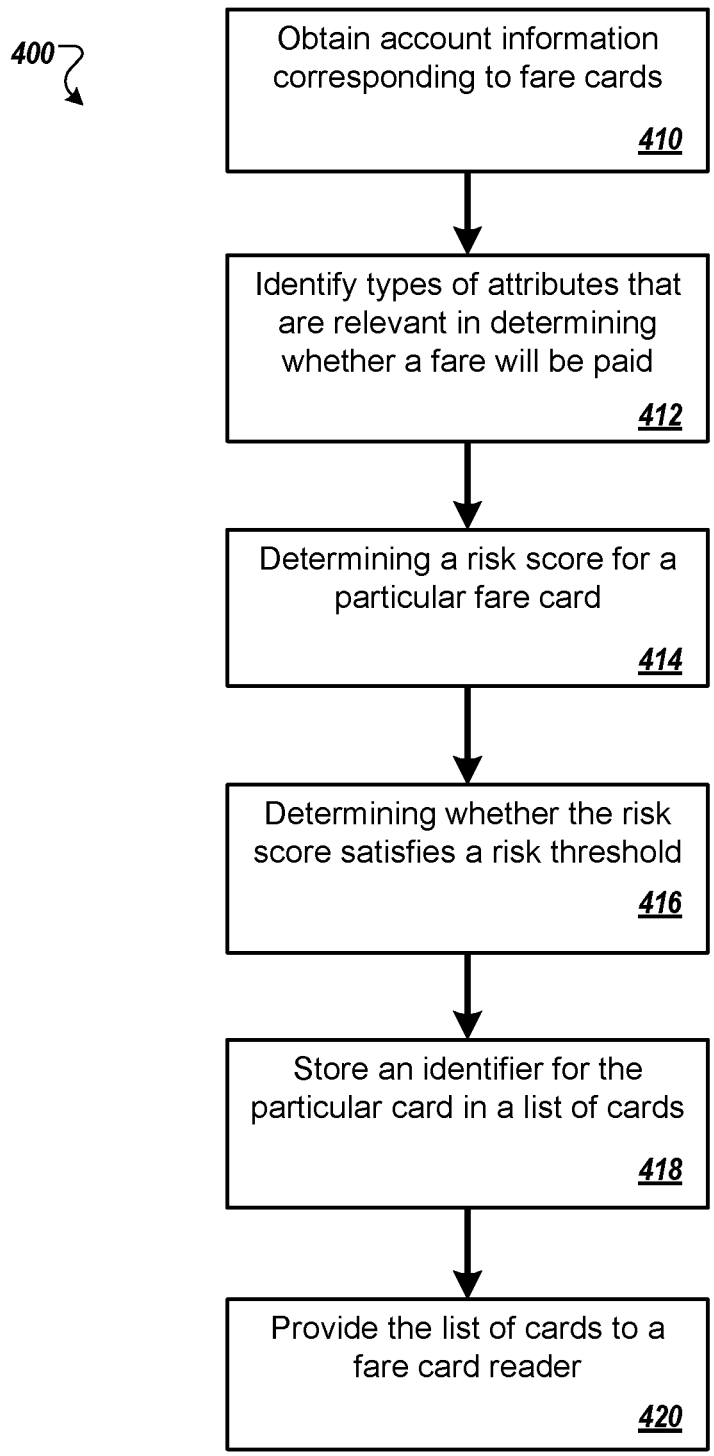
FIG. 4 is a flow diagram of an example process for identifying types of attributes that are relevant in determining whether a fare will be paid.

FIG. 4 is a flowchart of a process 400 for identifying types of attributes that are relevant in determining whether a fare will be paid. The following describes the processing 300 as being performed by components of the systems 100 and 300 that are described with reference to FIGS. 1 and 3. However, the process 400 may be performed by other systems or system configurations.

The process 400 may include obtaining account information corresponding to fare cards (410). For example, the attribute identifier 320 may obtain account information corresponding to fare cards from the account information database 310. The account information may include one or more fare card transaction records for each fare card, where each fare card transaction record reflects a fare card transaction and includes a label that indicates whether a fare for the fare card transaction was paid. The account information may further include attributes that indicate (i) information about the fare card at the time of the fare card transaction or (ii) a context of the fare card transaction. For example, the account information may include a first fare card transaction record that may indicate that a fare was paid, the fare card had an identifier of X, the balance was $5, the history length was one day, and a number of reloads was zero, a time of day was noon, and a location of a fare card reader was a location of reader X at the time of the transaction. A second fare card transaction record that may indicate that a fare was not paid, the fare card identifier was X, the balance was $2, the history length was one day, and a number of reloads was zero, a time of day was 1 PM, and a location of a fare card reader was a location of reader Y at the time of the transaction. And, a third fare card transaction record that may indicate that a fare was paid, the balance was $2, the history length was sixty day, and a number of reloads was three, a time of day was 1 PM, and a location of a fare card reader was a location of reader Y at the time of the transaction.

The process 400 may include identifying types of attributes that are relevant in determining whether a fare will be paid (412). For example, the attribute identifier 320 may identify from the account information the types of attributes in the account information that are relevant in determining whether a fare will be paid. The identification may be based on machine-learning where the input is the fare card transactions that are labeled by whether the fare was paid or unpaid and the output is the types of attributes that are relevant in matching the fare card transactions to the label. In other examples, the attribute identifier 320 may identify fare card transactions that were paid based on the labels, identify fare card transactions that were not paid based on the labels, and identify the types of attributes that have values for the fare card transactions that were paid that have different values for the fare card transactions there were not paid. Further, as discussed above, risk score functions and rules for local card analysis systems may be generated by the attribute identifier 320 based on the identification of the types of attributes in the account information that are relevant in determining whether a fare will be paid.

The process 400 may include determining a risk score for a particular fare card (414). For example, the risk score generator 322 may determine the risk score for a particular fare card based on the account information for the particular fare card and the identified types of attributes that are relevant in determining whether a fare will be paid. As described above, in some implementations, the attribute identifier 320 may determine a risk score function for generating a risk score and the risk score generator 322 may apply the risk score function to the account information to the particular card to obtain a risk score for the particular card.

The process 400 may include determining whether the risk score satisfies a risk threshold (416). For example, the card list engine 324 may determine whether the risk score for a particular card satisfies a risk threshold. The card list engine 324 may determine whether the risk score for a particular card satisfies a risk threshold based on determining whether the risk score exceeds a risk threshold. For example, a risk threshold may be 30%, 50%, 70% or some other percentage and a risk score higher than the risk threshold may be determined to satisfy the risk threshold.

The process 400 may include storing an identifier for the particular card in a list of cards (418). For example, the card list engine 324 may store into a list of cards the identifier for "Fare Card X" and account information for the particular card corresponding to the types of attributes identified to be relevant in determining whether a fare for a fare card transaction will be paid.

The process 400 may include providing the list of cards to a fare card reader (420). For example, the card list engine 324 may provide the list of cards including the information for "Fare Card X" to the local card analysis system 110 and provide the same list of cards to other local card analysis systems, or provide other list of cards tailored for the other local card analysis systems to the corresponding local card analysis systems.

Figure 5:
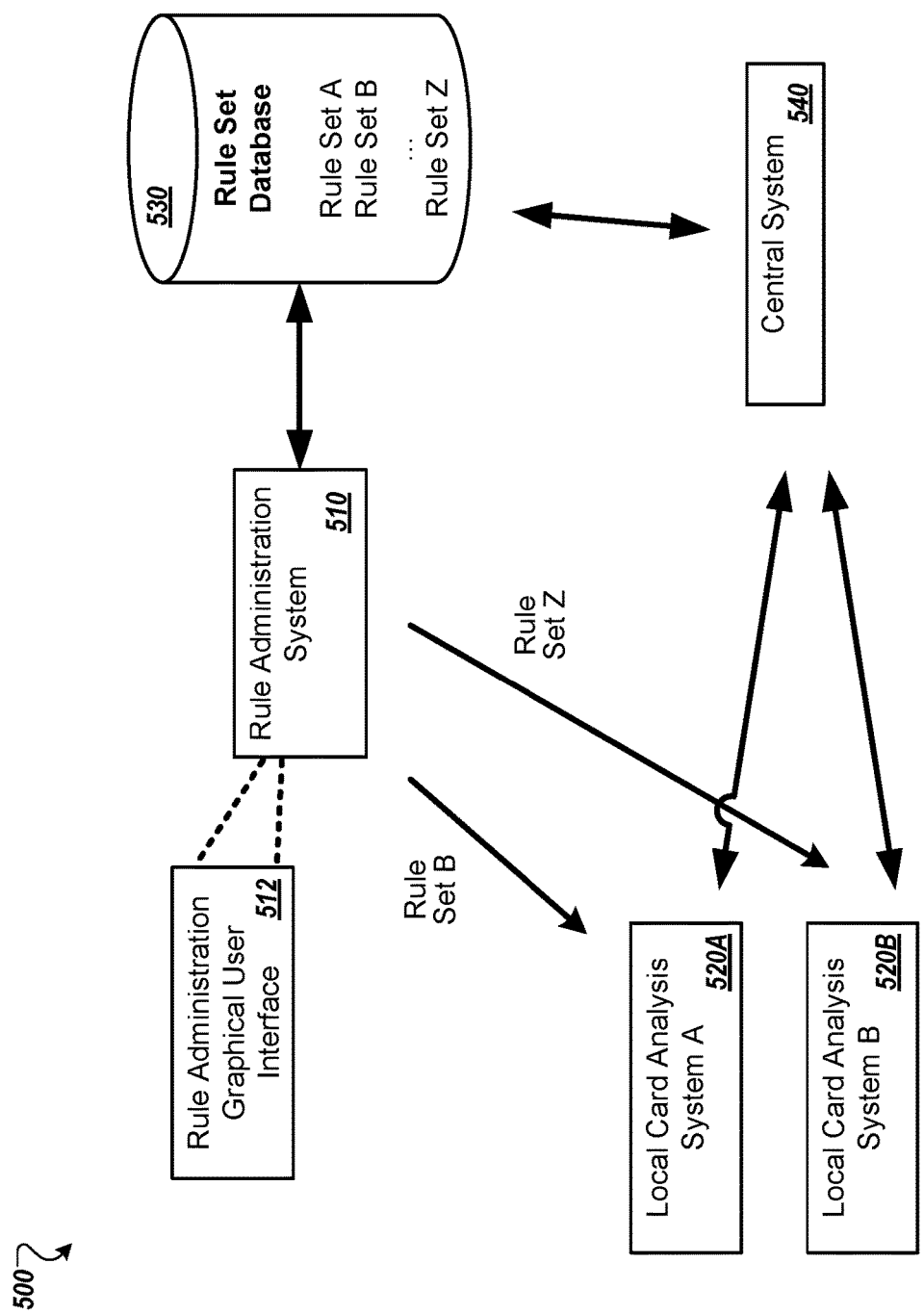
FIG. 5 is a block diagram of an example system that provides for administration of rules used in allowing or denying transactions in a transit service.

FIG. 5 is a block diagram of an example system 500 that provides for administration of rules used in allowing or denying transactions in a transit service. The system 500 may include a rule administration system 510, a local card analysis system A 520A, a local card analysis system B 520B, a rule set database 530, and a central system 540. In some implementations, the local card analysis system A 520A may the local card analysis system 110 and the central system 540 may be the central system 122.

The rule administration system 510 may enable an administrator to specify rules for local card analysis systems to use in allowing or denying transactions in a transit service when the local card analysis systems are not in communication with the central system 540 that normally determines whether or not a transaction should be allowed or denied. For example, the rule administration system 510 may enable an administrator to use a rule administration graphical user interface 512 to specify providing "Rule Set A" to the local card analysis system A 520A and providing "Rule Set B" to the local card analysis system B 520B for the local card analysis systems 520 to apply to transactions when the local card analysis systems 520 cannot communicate with central system 540. In the example, "Rule Set A" may specify that transactions with a risk level above 30% should be denied and "Rule Set B" may specify that transactions with a risk level above 80% should be denied. As described above, other rules identify, for example, transactions for any card in a card list being denied, transactions above a predetermined amount for a card in a card list being denied, transactions for a card with a balance less than a predetermined amount being automatically denied, etc.

The rule administration system 510 may provide conditions to the local card analysis systems 520 specifying when rules should be applied. For example, assume a transit service seeks to avoid a large backlog of people at the local card analysis system B 520B near a fireworks show on July 4$^{th}$. The rule administration system 510 may provide the local card analysis system B with conditions that specify to apply "Rule Set Z" on July 4$^{th}$ and otherwise apply "Rule Set Y," where "Rule Set Y" results in more denials of transactions than "Rule Set Z." In the example, the "Rule Set Y" could be a set of rules that is generated by the central system 540 for use by the local card analysis system B and that results in denial of 50% of transactions for cards on a card list. Whereas, "Rule Set Z" could be a set of rules that results in denial of 5% of transactions for cards on a card list.

The rule administration system 510 may determine the rules and conditions for use by the local card analysis systems 520 based on input from one or more administrators. For example, the rule administration system 510 may provide a graphical user interface for use by the administrator to select a fare card reader, one or more rules to apply to the selected fare card readers from the rule set database 530, and conditions specifying when each of the one or more rules should be applied by the selected fare card reader. Additionally or alternatively, the rule administration system 510 may automatically determine rules and conditions for use by the local card analysis systems 520 without selections from an administrator. For example, the rule administration system 510 may determine that an expected frequency of transactions at a particular fare card reader for a particular time period is above a predetermined threshold, and in response, provide the particular local card analysis system a set of rules that results in less denials of transaction than a default set of rules and conditions specifying to use the set of rules during the particular time period.

The rule administration system 510 may provide the selected local card analysis system the selected set of rules in association with the specified one or more conditions. For example, the administration system 510 may provide the local card analysis system B 520B "Rule Set Z" and instructions to apply "Rule Set Z" between 4 PM and 11:59 PM on July 4$^{th}$ and otherwise apply a default rule set. In another example, the administration system 510 may provide the local card analysis system B 520B "Rule Set Z," instructions to apply "Rule Set Z" between 4 PM and 11:59 PM on July 4$^{th}$, "Rule Set Y," and instructions to apply "Rule Set Y" by default.

The rule administration system 510 may provide the selected rule set and specified conditions in response to an administrator finishing selections. For example, the rule administration system 510 may provide a "Deploy" button and once an administer selects the "Deploy button, the rule set and specified conditions may be provided to the local card analysis system B 520B. In another example, the rule administration system 510 may provide the selected rule set and specified conditions not directly in response to an administrator finishing selections, e.g., the rule administration system 510 may wait to provide rules and conditions until there is less data traffic in the system 500, at a next pre-determined update time, or at a pre-determined time before when the condition may be satisfied.

In yet another example, the rule administration system 510 may provide the selected rule set and specified conditions based on determining whether the rule administration system 510 needs to provide a selected rule set to a local card analysis system. For example, the rule administration system 510 may receive administrator input to apply "Rule Set Z" to the local card analysis system B 520B from 4 PM to 11: PM on July 4$^{th}$, in response, provide a query to the local card analysis system B 520B asking whether "Rule Set Z" is already stored on the local card analysis system B 520B, receive a response indicating that "Rule Set Z" is already stored on the local card analysis system B 520B, and in response, not provide "Rule Set Z" but specify that "Rule Set Z" should be applied when the specified conditions are satisfied. In another example, the rule administration system 510 may receive administrator input to apply "Rule Set Z" to the local card analysis system B 520B from 4 PM to 11: PM on July 4th, provide a query to the local card analysis system B 520B asking whether "Rule Set Z" is already stored on the local card analysis system B 520B, receive a response indicating that "Rule Set Z" is not already stored on the local card analysis system B 520B, and in response, provide "Rule Set Z" and specify that "Rule Set Z" should be applied when the specified conditions are satisfied.

In some implementations, the rule administration system 510 may provide modified rule sets to the local card analysis systems 520 based on determining that a rule set has been modified. For example, the rule administration system 510 may determine that an administrator has increased a threshold risk for a rule from 20% to 25%. In response to determining the rule set has been modified, the rule administration system 510 may identify the local card analysis systems 520 that are using the rule set. For example, the rule administration system 510 may provide queries the local card analysis systems 520 asking whether the rule set is being used by the local card analysis system 520 and receive responses. In another example, the rule administration system 510 may store information tracking which rule sets were provided to which local card analysis systems 520 and may identify the local card analysis systems 520 that have stored information indicating they were provided the rule set. The rule administration system 510 may then provide the identified local card analysis systems 520 the modified rule set. For example, the rule administration system 510 may provide the modified rule set to each identified local card analysis system.

Figure 6:
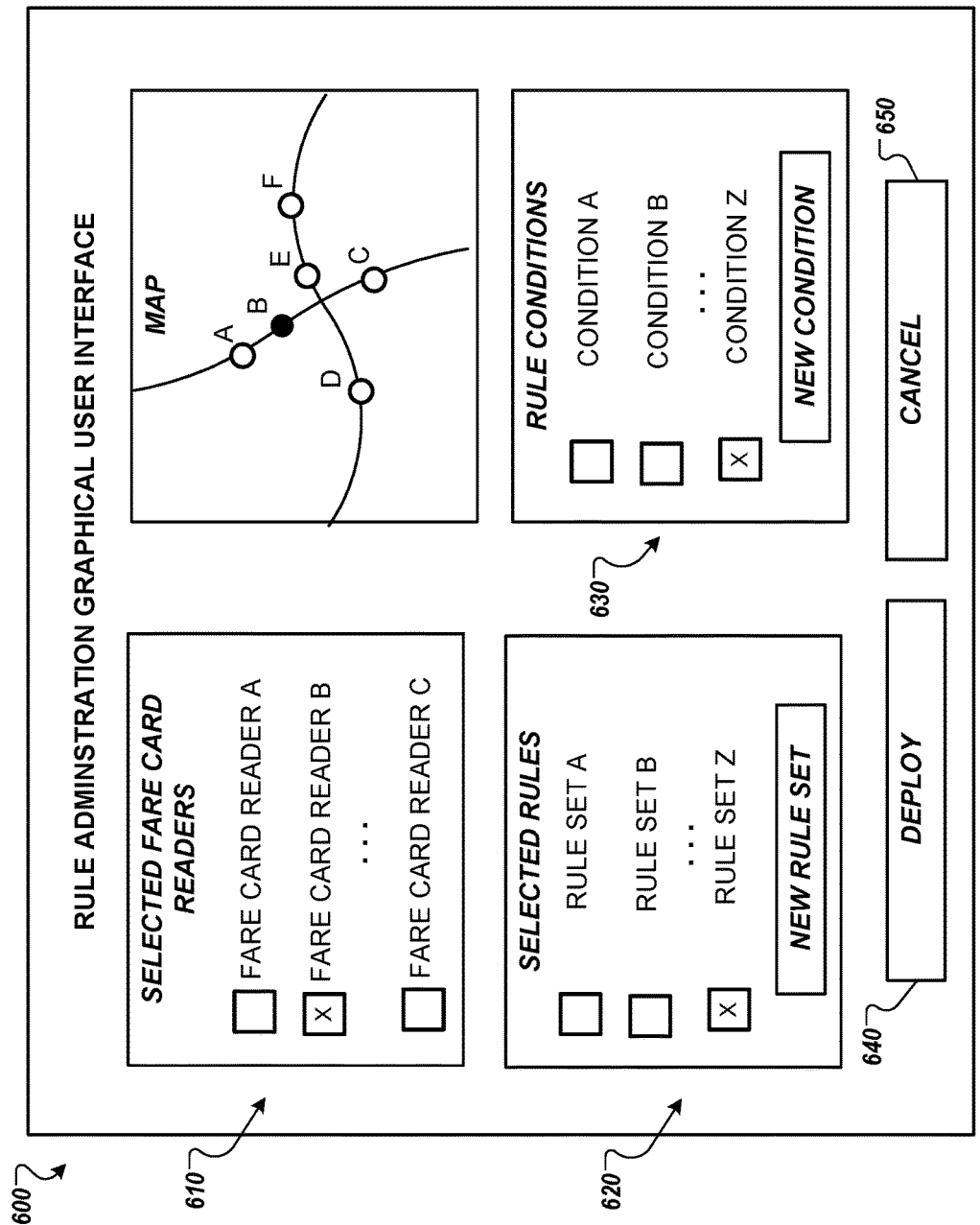
FIG. 6 is an example graphical user interface for administration of rules used in allowing or denying transactions in a transit service.

FIG. 6 is an example graphical user interface 600 for administration of rules used in allowing or denying transactions in a transit service. The interface 600 includes controls 610 for selecting one or more local card analysis systems, controls 620 for selecting one or more rules for one or more selected local card analysis systems to apply when the local card analysis system is not in communication with a central server, and controls 630 for specifying one or more conditions for when one or more selected local card analysis systems should apply the one or more selected set of rules. While the controls 610, 620, and 630 are shown with checkboxes, other types of controls may be used. For example, drop-down menus, radio buttons, textboxes, and other types of controls may be used selecting one or more local card analysis systems, selecting one or more rules, and specifying one or more conditions. The controls 610 may include a map with selectable icons representing local card analysis systems and positioned on the map corresponding to geographic locations of the local card analysis systems. The interface 600 may also include one or more of a control 640 for deploying the selection and a control 650 for canceling a selection.

In some implementations, the controls 610, 620, 630 may be provided in a sequential fashion. For example, the controls 610 may be initially shown and controls 620 and 630 not shown, in response to a selection from controls 610, controls 620 may be shown without controls 630, and in response to a selection of controls 620, the controls 630 may be shown. While the controls 610, 620, and 630 are shown simultaneously in the graphical user interface 600, the controls 610, 620, and 630, may be shown at separate times or may be shown using pop-up panels that overlap any of the controls 610, 620, and 630.

The rule administration system 510 may provide a graphical user interface including one or more controls for an administrator to select a local card analysis system. For example, the administrator system 510 may provide the graphical user interface 600 that includes the controls 610.

In providing the graphical user interface, the rule administration system 510 may identify the local card analysis systems that can be selected. For example, the rule administration system 510 may request that the central system 540 identify the fare card readers that may use rules to deny or allow transactions while offline from the central system 540 and then provide controls corresponding to the identified fare card readers. The administrator may then use the controls for the identified fare card reader to select the corresponding fare card reader.

The rule administration system 510 may receive a selection of a local card analysis system through the one or more controls. For example, the rule administration system 510 may receive a selection of local card analysis system B 520B through an administrator clicking on a checkbox for the local card analysis system B 520B.

The rule administration system 510 may provide one or more controls for the administrator to select a set of rules to apply to transactions when the local card analysis systems 520 are not in communication with the central system 540. For example, the rule administration system 510 may provide the controls 620.

The rule administration system 510 may obtain the sets of rules from the rule set database 530. The sets of rules stored in the rule set database 530 may include one or more rules that are manually specified by the administrator or automatically generated by the central system 540, as previously described above. For example, the rule administration system 510 may enable an administrator to create or modify sets of rules to be applied by the local card analysis systems and then store those rule sets in the rule set database 530. In a particular example, the rule administration system 510 may provide controls in a graphical user interface that allows the administrator to specify a "Rule Set Z" specifying that a transaction for any card on a card list should be approved if the last known balance of the card was positive, specify the "Rule Set Z" may only be used by the local card analysis system B 520B, specify "Rule Set Y" specifying that a transaction for any card on a card list should be approved if the last known balance of the card was greater than a value of the transaction, and specify that the "Rule Set Y" can be used by all local card analysis systems.

In some implementations, the rule administration system 510 may provide, enable, or disable, selection of sets of rules based on determining what rules may be applicable to the selected local card analysis system.

The rule administration system 510 may receive a selection of a set of rules for the selected local card analysis system to apply to fare card transactions. For example, the rule administration system 510 may receive a selection of "Rule Set Z" through an administrator clicking on a checkbox corresponding to "Rule Set Z."

The rule administration system 510 may provide one or more controls for the administrator to specify one or more conditions when the selected local card analysis system is to apply the set of rules to transactions when the local card analysis system is not in communication with the central system 540. For example, the rule administration system 510 may provide the controls.

The rule administration system 510 may receive user input specifying one or more conditions when the selected local card analysis system is to apply the set of rules. For example, the rule administration system 510 may receive user input specifying that local card analysis system B 520B should apply "Rule Set Z" between 4 PM to 11:59 PM on July $4^{th}$ based on an administrator selecting controls for specifying a time period beginning at 4 PM and ending at 11:59 PM on July $4^{th}$.

Figure 7:
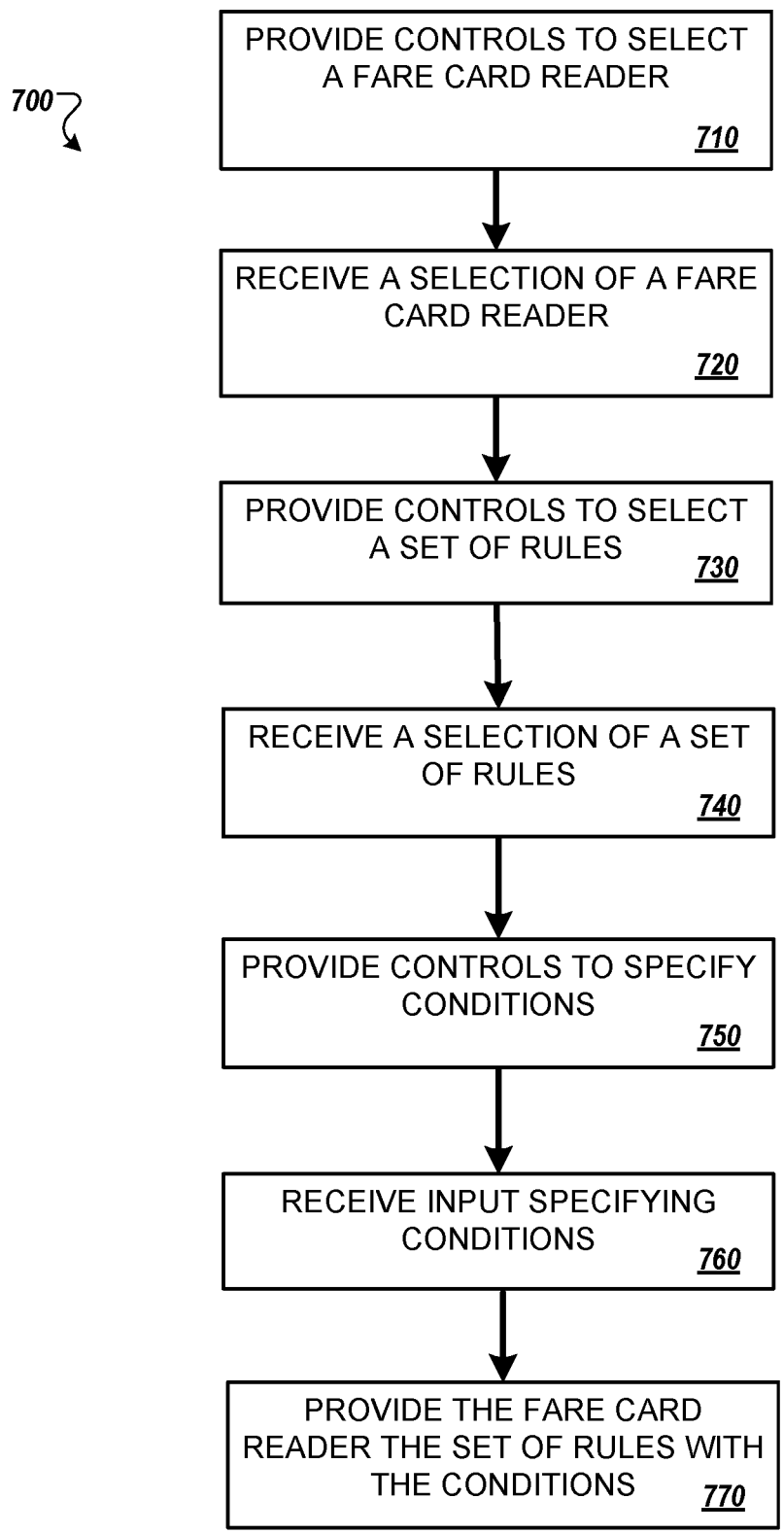
FIG. 7 is a flow diagram of an example process for administration of rules used in allowing or denying transactions.

FIG. 7 is a flow diagram of an example process 700 for administration of rules used in allowing or denying transactions. The following describes the processing 700 as being performed by components of the system 500 that is described with reference to FIG. 5. However, the process 500 may be performed by other systems or system configurations.

The process 500 may include providing controls to select a fare card reader (710). For example, the rule administration system 510 may provide a graphical user interface that includes a map with selectable icons for each fare card reader in a mass transit system. In another example, the rule administration system 510 may provide checkboxes, radio buttons, or a drop down menu with entries corresponding to each fare card reader.

The process 500 may include receiving a selection of a fare card reader (720). For example, the rule administration system 510 may detect that an administrator has selected icons for fare card readers A and C on a map. In another example, the rule administrator system 510 may determine that checkboxes for fare card readers A and C are checked.

The process 500 may include providing controls to select a set of rules (730). For example, in response to receiving selections for both fare card readers A and C, the rule administration system 510 may identify all sets of rules applicable to both fare carder readers A and C from the sets of rules stored in the rule set database 530 and provide a set of radio buttons corresponding to the sets of rules applicable to both fare card readers A and C. In another example, the rule administration system 510 may provide checkboxes for each of the sets of rules obtained from the rule set database 530.

The process 500 may include receiving a selection of a set of rules (740). For example, the rule administration system 510 may detect that an administrator has selected a radio button for "Rule Set M." In another example, the rule administration system 510 may receive checks of checkboxes for "Rule Set M" and "Rule Set N."

The process 500 may include providing controls to specify conditions (750). For example, the rule administration system 510 may provide controls for an administrator to select a type of condition, receive a selection of a type of condition as time period, and in response, provide controls for specifying a start time and end time.

The process 500 may include receiving input specifying conditions (760). For example, the rule administration system 510 may receive input specifying the start time of "11 PM on December 31" and specifying the end time of "4 AM on January 1" for a time period to apply the "Rule Set M."

The process 500 may include providing the fare card reader the set of rules with the conditions (770). For example, the rule administration system 510 may provide local card analysis system A 520A and local card analysis system C the "Rule Set M" and conditions of "11 PM on December 31" to 4 AM on January 1."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
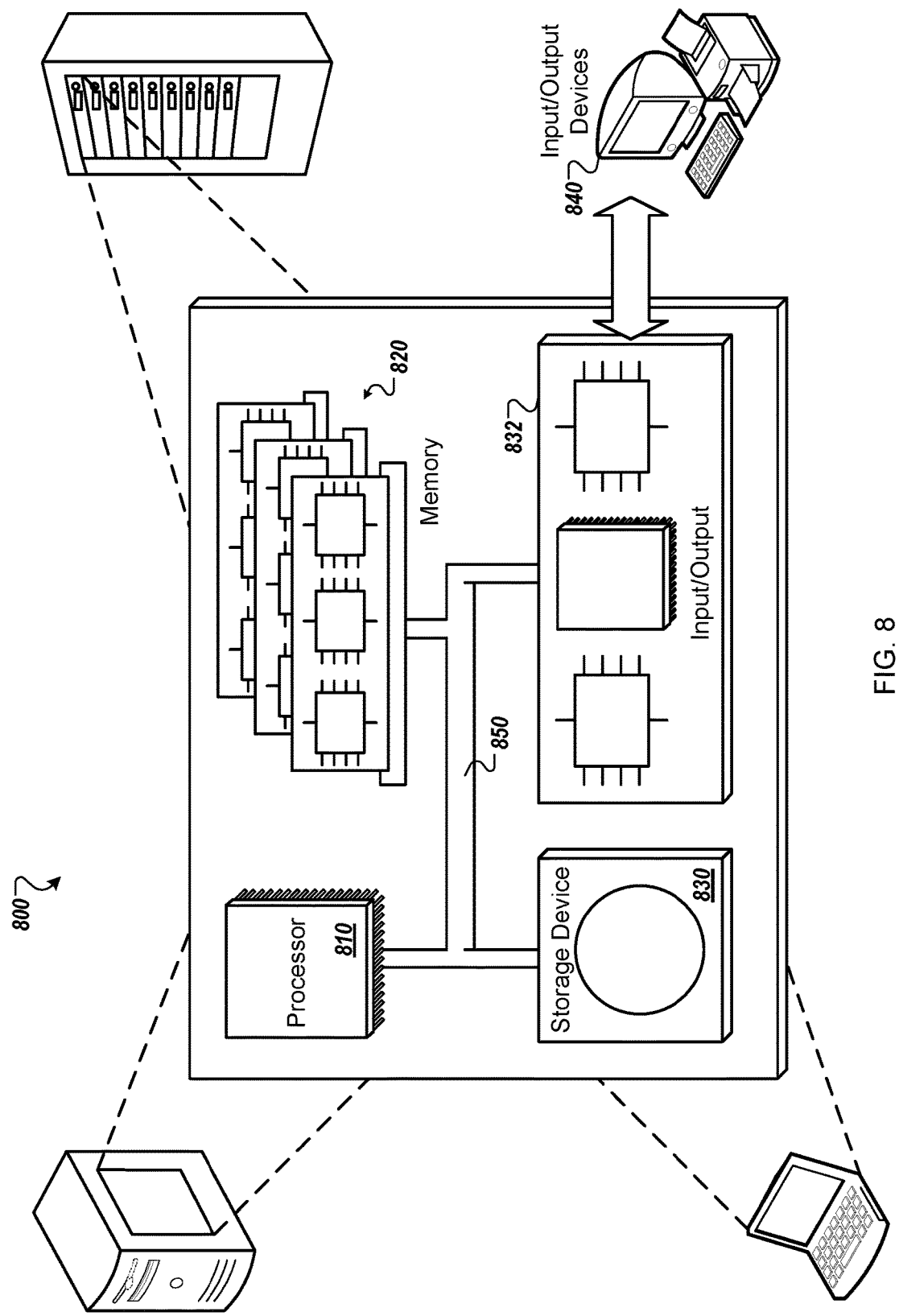
FIG. 8 is a block diagram of a computing system that can be used in connection with computer-implemented methods described in this document.

An example of one such type of computer is shown in FIG. 8, which shows a schematic diagram of a generic computer system 800. The system 800 can be used for the operations described in association with any of the computer-implemented methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output module 832 includes hardware or hardware and software for interfacing system 800 with the input/output device 840 or other devices or interfaces.

The input/output device 840 provides input/output operations for the system 800. In one implementation, the input/output device 840 includes a keyboard and/or pointing device. In another implementation, the input/output device 840 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating, by one or more rule administration servers of a transit access system that includes (i) the one or more rule administration servers, (ii) one or more central servers, (iii) fare card readers that are each configured to read closed-loop fare cards, and that are configured to open or close a transit gate based on a remote analysis, by the one or more central servers, when the one or more central servers are in network communication with the fare card readers, or based on a local risk analysis when the one or more central servers are not in network communication with the fare card readers, and (iv) a rule set database that stores sets of rules, a graphical user interface including one or more controls for selecting one or more of the fare card readers;
   receiving, by the one or more rule administration servers, a selection of a particular fare card reader through the one or more controls;
   receiving, by the one or more rule administration servers, a selection of a particular set of rules, from among the sets of rules that are stored in the rule set database, for the particular fare card reader, the particular set of rules to be applied to fare card transactions when the one or more central servers are not in network communication with the particular fare card reader;

receiving, by the one or more rule administration servers, input specifying one or more conditions specifying when the selected fare card reader is to apply the set of rules to fare card transactions when the particular fare card reader is not in communication with the one or more central servers, the one or more conditions specifying one or more conditions under which the particular fare card reader is to apply the particular set of rules;

providing, by the one or more central servers to the particular fare card reader, the particular set of rules and the specified one or more conditions to the particular fare card reader for use by the particular fare card reader in performing the local risk analysis when the one or more central servers are not in network communication with the particular fare card reader; and in response to determining, by the particular fare card reader, that the one or more central servers are not in network communication with the particular fare card reader, determining to open or close the transit gate based on the local risk analysis that is based on the particular set of rules and the specified one or more conditions.

2. The method of claim 1, wherein generating a graphical user interface including one or more controls comprises:
identifying multiple fare card readers in a mass transit system; and
providing in the graphical user interface one or more controls to select one or more of the multiple fare card readers of the mass transit system.

3. The method of claim 1, wherein generating a graphical user interface including one or more controls comprises:
providing, on the graphical user interface, one or more controls for selecting one or more sets of rules for the particular fare card reader to apply to fare card transactions when the fare card reader is not in network communication with the one or more central servers.

4. The method of claim 1, comprising:
providing in the graphical user interface one or more controls to specify the one or more conditions that the particular fare card reader is to apply to fare card transactions when the particular fare card reader is not in network communication with the one or more central servers.

5. The method of claim 1, comprising:
after providing the particular set of rules to the particular fare card reader, determining that the particular set of rules has been updated;
in response to determining that the particular set of rules has been updated, identifying the particular fare card reader; and
providing an update to the particular set of rules to the particular fare card reader.

6. The method of claim 1, wherein the particular set of rules specifies that transactions that satisfy a particular risk threshold should be denied, and that the transit gate should remain closed.

7. The method of claim 1, wherein the one or more conditions specifies a date or date range during which the particular set of rules should be applied by the particular fare card reader.

8. A transit access system that includes (i) one or more rule administration servers, (ii) one or more central servers, (iii) fare card readers that are each configured to read closed-loop fare cards, and that are configured to open or close a transit gate based on a remote analysis, by the one or more central servers, when the one or more central servers are in network communication with the fare card readers, or based on a local risk analysis when the one or more central servers are not in network communication with the fare card readers, and (iv) a rule set database that stores sets of rules, the transit access system comprising:

one or more computers and one or more storage devices storing instructions that are operable, when executed by the one or more computers, to cause the one or more computers to perform operations comprising:

generating, by one or more rule administration servers of a transit access system, a graphical user interface including one or more controls for selecting one or more of the fare card readers;

receiving, by the one or more rule administration servers, a selection of a particular fare card reader through the one or more controls;

receiving, by the one or more rule administration servers, a selection of a particular set of rules, from among the sets of rules that are stored in the rule set database, for the particular fare card reader, the particular set of rules to be applied to fare card transactions when the one or more central servers are not in network communication with the particular fare card reader;

receiving, by the one or more rule administration servers, input specifying one or more conditions specifying when the selected fare card reader is to apply the set of rules to fare card transactions when the particular fare card reader is not in communication with the one or more central servers, the one or more conditions specifying one or more conditions under which the particular fare card reader is to apply the particular set of rules;

providing, by the one or more central servers to the particular fare card reader, the particular set of rules and the specified one or more conditions to the particular fare card reader for use by the particular fare card reader in performing the local risk analysis when the one or more central servers are not in network communication with the particular fare card reader;

in response to determining, by the particular fare card reader, that the one or more central servers are not in network communication with the particular fare card reader, determining to open or close the transit gate based on the local risk analysis that is based on the particular set of rules and the specified one or more conditions.

9. The transit access system of claim 8, wherein generating a graphical user interface including one or more controls comprises:
identifying multiple fare card readers in a mass transit system; and
providing in the graphical user interface one or more controls to select one or more of the multiple fare card readers of the mass transit system.

10. The transit access system of claim 8, wherein generating a graphical user interface including one or more controls comprises:
providing, on the graphical user interface, one or more controls for selecting one or more sets of rules for the particular fare card reader to apply to fare card transactions when the fare card reader is not in network communication with the one or more central servers.

11. The transit access system of claim 8, wherein the operations comprise:

providing in the graphical user interface one or more controls to specify the one or more conditions that the particular fare card reader is to apply to fare card transactions when the particular fare card reader is not in network communication with the one or more central servers.

12. The transit access system of claim 8, wherein the operations comprise:
after providing the particular set of rules to the particular fare card reader, determining that the particular set of rules has been updated;
in response to determining that the particular set of rules has been updated, identifying the particular fare card reader; and
providing an update to the particular set of rules to the particular fare card reader.

13. The transit access system of claim 8, wherein the particular set of rules specifies that transactions that satisfy a particular risk threshold should be denied, and that the transit gate should remain closed.

14. The transit access system of claim 8, wherein the one or more conditions specifies a date or date range during which the particular set of rules should be applied by the particular fare card reader.

15. A non-transitory computer-readable medium storing software comprising instructions executable by one or more computers which, upon such execution, cause the one or more computers to perform operations comprising:
generating, by one or more rule administration servers of a transit access system that includes (i) the one or more rule administration servers, (ii) one or more central servers, (iii) fare card readers that are each configured to read closed-loop fare cards, and that are configured to open or close a transit gate based on a remote analysis, by the one or more central servers, when the one or more central servers are in network communication with the fare card readers, or based on a local risk analysis when the one or more central servers are not in network communication with the fare card readers, and (iv) a rule set database that stores sets of rules, a graphical user interface including one or more controls for selecting one or more of the fare card readers;
receiving, by the one or more rule administration servers, a selection of a particular fare card reader through the one or more controls;
receiving, by the one or more rule administration servers, a selection of a particular set of rules, from among the sets of rules that are stored in the rule set database, for the particular fare card reader, the particular set of rules to be applied to fare card transactions when the one or more central servers are not in network communication with the particular fare card reader;
receiving, by the one or more rule administration servers, input specifying one or more conditions specifying when the selected fare card reader is to apply the set of rules to fare card transactions when the particular fare card reader is not in communication with the one or more central servers, the one or more conditions specifying one or more conditions under which the particular fare card reader is to apply the particular set of rules;
providing, by the one or more central servers to the particular fare card reader, the particular set of rules and the specified one or more conditions to the particular fare card reader for use by the particular fare card reader in performing the local risk analysis when the one or more central servers are not in network communication with the particular fare card reader;
in response to determining, by the particular fare card reader, that the one or more central servers are not in network communication with the particular fare card reader, determining to open or close the transit gate based on the local risk analysis that is based on the particular set of rules and the specified one or more conditions.

16. The medium of claim 15, wherein generating a graphical user interface including one or more controls comprises:
identifying multiple fare card readers in a mass transit system; and
providing in the graphical user interface one or more controls to select one or more of the multiple fare card readers of the mass transit system.

17. The medium of claim 15, wherein generating a graphical user interface including one or more controls comprises:
providing, on the graphical user interface, one or more controls for selecting one or more sets of rules for the particular fare card reader to apply to fare card transactions when the fare card reader is not in network communication with the one or more central servers.

18. The medium of claim 15, wherein the operations comprise:
providing in the graphical user interface one or more controls to specify the one or more conditions that the particular fare card reader is to apply to fare card transactions when the particular fare card reader is not in network communication with the one or more central servers.

19. The medium of claim 15, wherein the operations comprise:
after providing the particular set of rules to the particular fare card reader, determining that the particular set of rules has been updated;
in response to determining that the particular set of rules has been updated, identifying the particular fare card reader; and
providing an update to the particular set of rules to the particular fare card reader.

20. The medium of claim 15, wherein the particular set of rules specifies that transactions that satisfy a particular risk threshold should be denied, and that the transit gate should remain closed.

* * * * *